(12) United States Patent
Iwasaki et al.

(10) Patent No.: US 10,099,687 B2
(45) Date of Patent: Oct. 16, 2018

(54) AUTOMATIC CLUTCH VEHICLE

(71) Applicant: HONDA MOTOR CO., LTD., Tokyo (JP)

(72) Inventors: Kenjiro Iwasaki, Wako (JP); Tetsuya Kudoh, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 20 days.

(21) Appl. No.: 15/274,964

(22) Filed: Sep. 23, 2016

(65) Prior Publication Data

US 2017/0088129 A1    Mar. 30, 2017

(30) Foreign Application Priority Data

Sep. 30, 2015 (JP) ................... 2015-194647

(51) Int. Cl.
| | |
|---|---|
| *B60W 10/02* | (2006.01) |
| *B60W 30/02* | (2012.01) |
| *B60W 10/06* | (2006.01) |
| *B60W 10/184* | (2012.01) |
| *B60W 30/18* | (2012.01) |
| *F16D 43/04* | (2006.01) |
| *B60W 30/19* | (2012.01) |

(52) U.S. Cl.
CPC .......... *B60W 30/025* (2013.01); *B60W 10/02* (2013.01); *B60W 10/06* (2013.01); *B60W 10/184* (2013.01); *B60W 30/18027* (2013.01); *B60W 30/18172* (2013.01); *B60W 30/19* (2013.01); *F16D 43/04* (2013.01); *B60W 2300/36* (2013.01); *B60W 2510/0638* (2013.01); *B60W 2520/10* (2013.01); *B60W 2520/30* (2013.01); *B60W 2710/021* (2013.01); *B60W 2710/027* (2013.01); *B60W 2710/18* (2013.01)

(58) Field of Classification Search
None
See application file for complete search history.

(56) References Cited

U.S. PATENT DOCUMENTS

| | | | | |
|---|---|---|---|---|
| 9,764,726 B2 * | 9/2017 | Gibson | ................. | B60W 10/06 |
| 9,789,868 B2 * | 10/2017 | Gibson | ................. | B60W 20/40 |
| 2015/0210270 A1 * | 7/2015 | Pietron | .................... | B60K 6/48 |
| | | | | 477/5 |

FOREIGN PATENT DOCUMENTS

JP    2009-287606 A    12/2009

* cited by examiner

*Primary Examiner* — Justin Holmes
(74) *Attorney, Agent, or Firm* — Westerman, Hattori, Daniels & Adrian, LLP

(57) ABSTRACT

It is preferable to reduce an uncomfortable feeling arising from an abrupt driving force generated in an automatic starting clutch in an automatic clutch vehicle. When an automatic clutch operating device is about to automatically engage a starting clutch, a brake controller drives a brake actuator to forcibly actuate a brake device, thereby braking a driving wheel WR. Here, a brake pressure to be applied to the driving wheel WR can be set as a brake pressure such as to change an expected driving torque which is accompanied by an uncomfortable feeling in the absence of control by the brake controller into a norm driving torque which is not accompanied by the uncomfortable feeling, taking into account the clutch capacity and an engine control output.

15 Claims, 12 Drawing Sheets

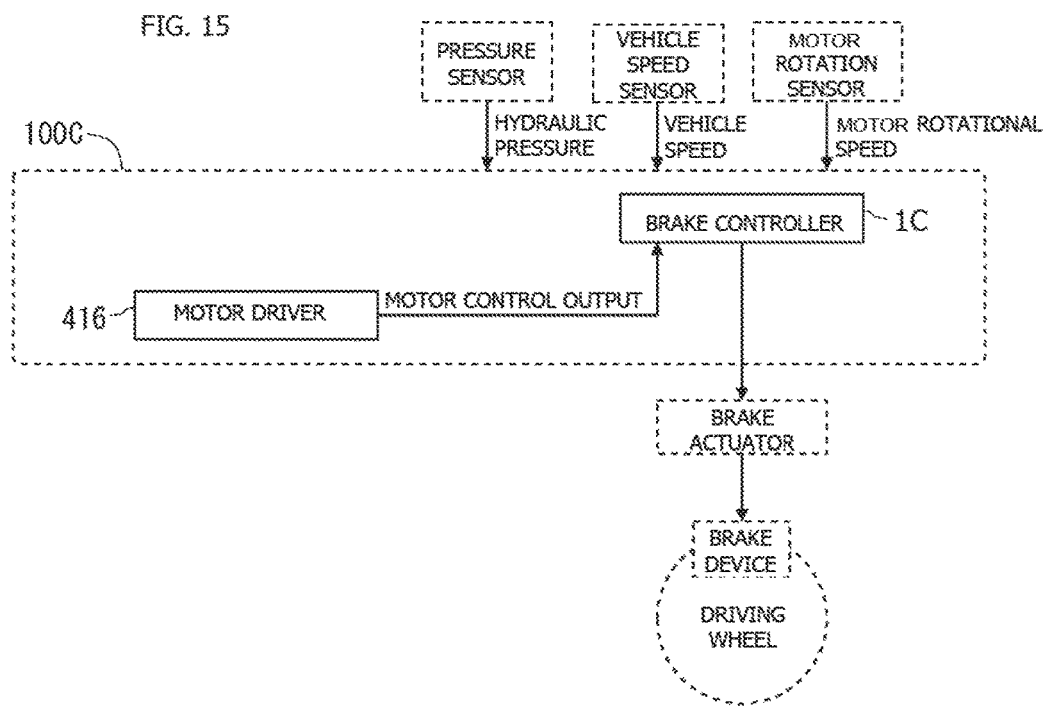

AUTOMATIC CLUTCH VEHICLE

TECHNICAL FIELD

The present disclosure relates to an automatic clutch vehicle in which clutch operations are automatically performed by a driving force transmission device. Particularly, the disclosure relates to an automatic clutch vehicle which can reduce the driver's uncomfortable feeling arising from an abrupt change in driving force or the like generated on an automatic clutch operation.

BACKGROUND

In relation to a vehicle wherein a driving force transmission device (a device including a speed reduction gear, a clutch, a transmission and a control system for them, between a power source and a driving wheel) automatically performs clutch operations (the vehicle will be referred to as an automatic clutch vehicle), there exists, for example, the technology as disclosed in Japanese Parent Laid-Open No. 2009-287606.

Specifically, there is a problem that a clutch control amount at the time of actual start of rotation of a driving wheel in an automatic clutch vehicle may vary depending on product-to-product variability of the clutch, an increase in friction in a driving force transmission system, etc., and, as a countermeasure against this problem, Japanese Patent Laid-open No. 2009-287606 discloses a technology in which a control, correction amount is calculated on the basis of the clutch control amount at the time of start of rolling of the driving wheel.

SUMMARY

However, in the automatic clutch vehicle according to the related art, which is so set that a driving force is transmitted as smoothly as possible, there is yet a problem as follows. When clutch control is automatically conducted according to a vehicle speed or engine rotational speed in the vicinity of an extremely low vehicle speed (for example, a region of vehicle speed of not more than 10 km/hour, inclusive of the occasion of vehicle starting) and a switching of "clutch-OFF→partial clutch engagement→clutch-ON" or conversely a switching of "clutch-ON→partial clutch engagement→clutch-OFF" occurs, the driver may get an uncomfortable feeling depending on the ON/OFF switching of the driving force or the magnitude of a change in the driving wheel torque. Such a situation also occurs in the cases of, for example, a scooter having a centrifugal clutch as well as a high-output engine, representing another example of automatic clutch vehicle.

In consideration of the above-mentioned problem involved in the related art, it is preferable to provide an automatic clutch vehicle such that the driver's uncomfortable feeling due to automatic ON/OFF switching of a driving force as above-mentioned can be reduced.

For example, the present disclosure has the following characteristics (1) to (7).

(1) An automatic clutch vehicle (10A, 10B, 10C) includes a power source configured as an engine (11, E) or a motor (450), a driving force transmission device (16, M, 543) provided between the power source and a driving wheel (WR), and a starting clutch (CL1, CL2, 326, 540) which is provided in the driving force transmission device (16, M, 543) and which is engaged or disengaged to transmit or interrupt transmission of a rotating force of the power source to the driving wheel (WR). The automatic clutch vehicle (10A, 10B, 10C) is provided with an automatic clutch operating device (18, 326, 540) which automatically performs an operation of engaging or disengaging the starting clutch (CL1, CL2, 326, 540). The automatic clutch vehicle (10A, 10B, 10C) further includes a brake device (4a) which is provided at the driving wheel (WR) and brakes the driving wheel (WR), a brake actuator (14a) which operates the brake device (4a), and a brake controller (1, 1B, 1C) which controls the brake actuator (14a). The brake controller (1, 1B, 1C) brakes rotation of the driving wheel (WR) by operating the brake actuator (14a) when the automatic clutch operating device (18, 326, 540) automatically engages the starting clutch (CL1, CL2, 326, 540).

(2) In the characteristic of (1) above, further, the automatic clutch vehicle further includes a rotational speed sensor (36, 572) which detects rotational speed of the power source, and a vehicle speed sensor (16a) which detects a vehicle speed. The brake controller (1, 1B, 1C) brakes the driving wheel (WR) by operating the brake actuator (14a), in the case where a vehicle speed detected by the vehicle speed sensor (16a) is not more than a predetermined threshold and a rotational speed detected by the rotational speed sensor (36, 572) is in a predetermined partial clutch engagement rotation region in which the automatic clutch operating device (18, 326, 540) automatically engages the starting clutch (CL1, CL2, 326, 549).

(3) In the characteristic of (2) above, further, the power source is configured as an engine (11, E). The starting clutch (CL1, CL2, 326, 540) is a variable capacity clutch (CL1, CL2, 326) such that clutch capacity can be selected. The automatic clutch operating device (18, 326, 540) performs electronic control of capacity of the variable capacity clutch (CL1, CL2, 326). The brake controller (1, 1B, 1C) controls the brake actuator (14a) on the basis of a first parameter concerning the clutch capacity controlled by the automatic clutch operating device (18).

(4) In the characteristic of (3) above, further, the automatic clutch vehicle further includes an engine controller (60) which controls the engine (11, E). The brake controller (1, 1B, 1C) controls the brake actuator (14a) on the basis of a second parameter concerning an engine control output by the engine controller (60).

(5) In the characteristic of (4) above, further, the brake controller (1, 1B, 1C) derives an expected driving torque which is expected to be generated on the driving wheel (WR) in the case where control by the brake controller (1, 1B, 1C) is not conducted and a norm driving torque which is smaller than the expected driving torque and serves as a norm, on the basis of the first parameter concerning the clutch capacity and the second parameter concerning the engine control output. The brake controller (1, 1B, 1C) further controls the brake actuator (14a) on the basis of a difference between the expected driving torque and the norm driving torque.

(6) In the characteristic of (1) above, further, the starting clutch (CL1, CL2, 326, 540) and the automatic clutch operating device (18, 326, 540) are configured as a centrifugal clutch (236, 540) including an inner rotor (328, 542) and an outer rotor (341, 541) and a centrifugal weight capable of engaging and disengaging the inner rotor (328, 542) and the outer rotor (341, 541). The automatic clutch vehicle further includes a rotational speed sensor (332, 572) which detects rotational speed of the inner rotor (328, 542) in the centrifugal, clutch (326, 540) end a vehicle speed sensor (16a) which detects a vehicle speed. The brake controller (1, 1B, 1C) brakes the driving wheel (WR) by operating the brake actuator (14*a*), in the case where a vehicle speed detected by the vehicle speed sensor (16*a*) is not more than a predetermined, threshold and a rotational speed detected by the rotational speed sensor (332, 572) is in a predetermined partial clutch engagement rotation region in which the centrifugal clutch (326, 540) performs an engaging or disengaging operation.

(7) In the characteristic of (2) or (6) above, further, the brake controller (1, 1B, 1C) brakes the driving wheel (WR) by operating the brake actuator (14*a*) at a fixed output, in the case where the vehicle speed is not more than a predetermined threshold and the rotational speed, is in a predetermined partial clutch engagement rotation region. In the above explanation of the exemplary embodiment, specific elements with their reference numerals are indicated by using brackets. These specific elements are presented as mere examples in order to facilitate understanding, and thus, should not be interpreted as any limitation to the accompanying claims.

According to the characteristic of (1) above, brake control on the driving wheel is automatically conducted when engagement of the automatic clutch is generated. By this, a rise of the driving force attendant on the clutch engagement is reduced by braking. As a result, a driving force-associated uncomfortable feeling given to the driver by the automatic clutch can be reduced.

According to the characteristic of (2) above, brake control on the driving wheel is automatically performed when engagement of the automatic clutch is generated at the time of an extremely low speed determined by comparison of the vehicle speed with a threshold. By this, a rise of the driving force attendant on clutch engagement is reduced by braking. Consequently a driving force-associated uncomfortable feeling given to the driver by the automatic clutch can be reduced.

According to the characteristic of (3) above, an optimum driving force control is conducted taking clutch capacity into account, whereby a further reduction in the uncomfortable feeling can be achieved.

According to the characteristic of (4) above, an optimum driving force control is performed taking an engine control output into consideration, whereby a further reduction in the uncomfortable feeling can be achieved.

According to the characteristic of (5) above, a driving torque to be a norm (model) is preliminarily set on the basis of calculations or experiments, and an expected driving torque and a norm driving torque are compared with each other according to engine control parameters or clutch control parameters in the vicinity of a partial clutch engagement rotation region, whereby a brake control amount can be controlled to fee adapted to a norm driving torque.

According to the characteristic of (6) above, in an automatic clutch vehicle having a configuration wherein a centrifugal clutch and a driving wheel are provided on the downstream side of a driven pulley, such as a scooter type vehicle, for example, a partial clutch engagement rotation region can be detected by detecting the rotational speed of an inner rotor of the centrifugal clutch. Brake control is applied in the partial clutch engagement rotation region, whereby it is possible to restrain an abrupt rise of the driving force, and thereby to reduce the uncomfortable feeling.

According to the characteristic of (7) above, the brake actuator is operated at a fixed output whenever a predetermined condition is satisfied. By this, it is possible to restrain an abrupt rise of the driving force, while simplifying the control.

BRIEF DESCRIPTION OR THE DRAWINGS

The advantages of the disclosure will become apparent in the following description taken in conjunction with the following drawings.

FIG. 15 illustrates a main part of a system configuration for realizing a reduction in the driver's uncomfortable feeling in the third embodiment.

DETAILED DESCRIPTION

Figure 1:
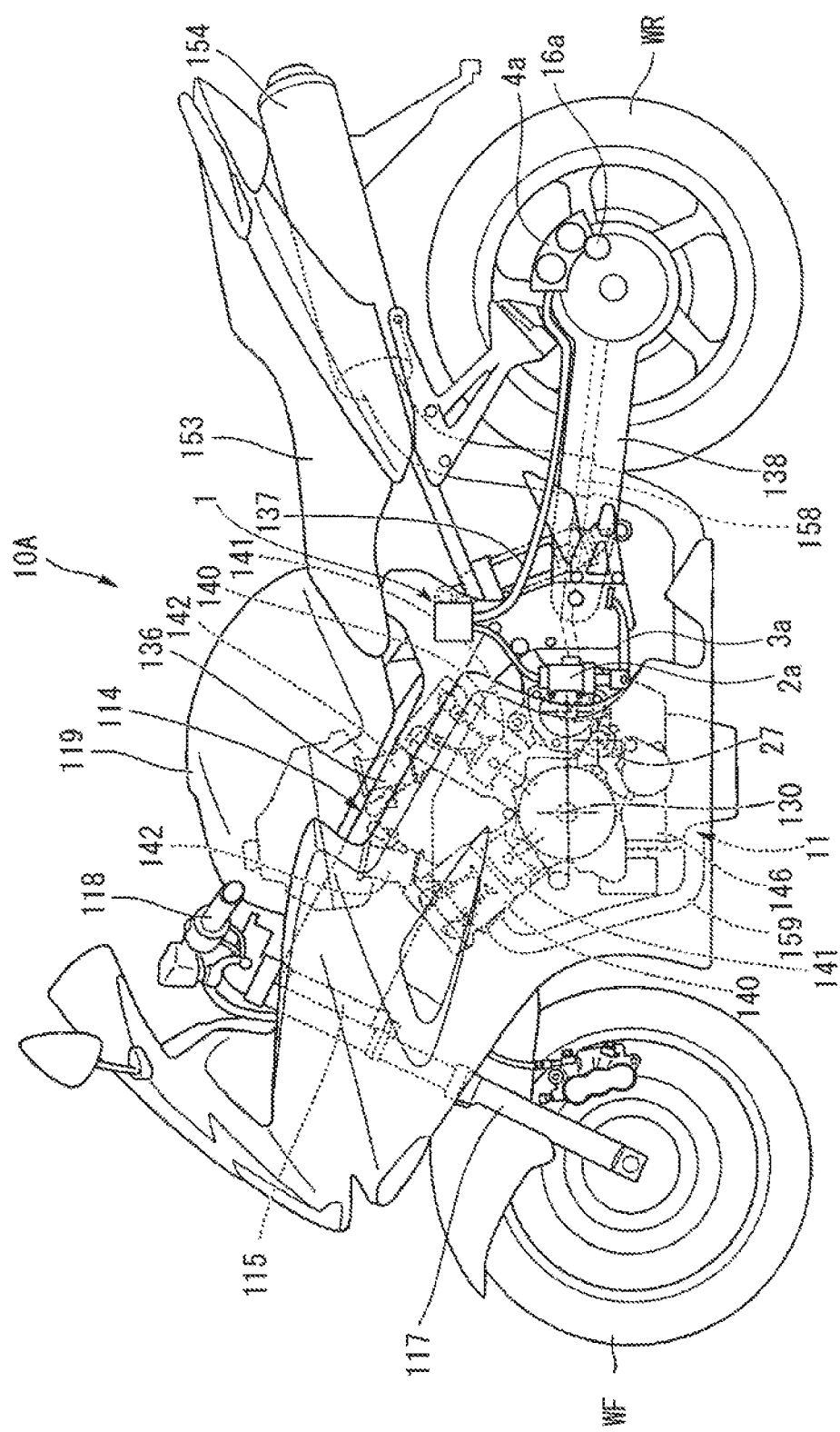
FIG. 1 is a side view of a motorcycle to which a brake controller according to a first embodiment has been applied.

Preferred embodiments of the present invention will be described in detail below, referring to the drawings. FIG. 1 is a side view of a motorcycle 10A to which a brake controller according to a first embodiment of the present invention has been applied. A body frame 114 of the motorcycle 10A has a pair of left and right main pipes 136, and a head pipe 115 is provided on the vehicle body front side of the main pipes 136. A pair of left and right front forks 117 by which a front wheel WF is rotatably supported in a steerable manner and by which a steering handle 118 is supported is rotatably supported by the head pipe 115.

An engine 11 suspended on the lower aide of the main pipes 136 is a V type four-cylinder engine with front and rear cylinders disposed with a predetermined included angle. A piston 141 sliding inside a cylinder block 140 and a valve mechanism and the like are configured in the same manner for the four cylinders. In a crankcase 146, there are accommodated a crankshaft 130 by which connecting rods supporting the pistons 141 are rotatably supported, and a main shaft 26 (FIG. 2) and a counter shaft 27 to which a plurality of pairs of gears constituting a transmission are mounted.

Between the front and rear cylinder blocks, there are disposed air funnels 142 through which, fresh air passed through an air cleaner box disposed at a lower portion of a fuel tank 119 is introduced to an intake port of each of the cylinders. Fuel injection valves are each attached to the air funnels 142. On the lower side of a seat 153, there is provided a muffler 154 for exhausting a combustion gas led reward the vehicle body rear side by an exhaust pipe 159 connected to exhaust ports of the cylinder blocks 140.

As a configuration for performing a brake Operation on the side of a rear wheel WR serving as a driving wheel by automatic control or manually, a brake controller 1 is disposed in a space surrounded by the pair of left and right main pipes 136; in addition, a brake pedal 3a is rotatably mounted at lower end rear portions of the main pipes 136 on the rear side of the engine 11, and a master cylinder 2a for generating a hydraulic pressure by a driver's operation on the brake pedal 3a is disposed. A brake disk mounted to the rear wheel WR is provided with a brake caliper 4a for braking the brake disk by a hydraulic pressure generated in a brake pipe by a driver's operation on the brake pedal 3a or by automatic control of the brake controller 1. In addition, a vehicle speed sensor 16a for determining a vehicle speed by detecting the rotational speed of the rear wheel WR is provided.

At rear lower portions of the main pipes 136, a swing arm 138 which is suspended by a shock absorbing unit 137 and by which the rear wheel WR is rotatably supported is swingably supported. Inside the swing arm 138, there is disposed a drive shaft 158 by which a rotational driving force outputted from the counter shaft 27 is transmitted to the rear wheel WR serving as a driving wheel.

In the engine 11 according to this embodiment, a hydraulic clutch engaged or disengaged to transmit or interrupt transmission of a rotating driving force between the engine 11 and the transmission is configured as a twin clutch including a first clutch and a second clutch, and the hydraulic pressure to be supplied to the twin clutch is controlled toy an actuator. Besides, a first valve 42a and a second valve 42b (see FIG. 2 to be described next) as the actuator for controlling both of the clutches are mounted at a left side portion of the engine 11. The configuration of the transmission to which the twin clutch is applied will be described later.

Figure 2:
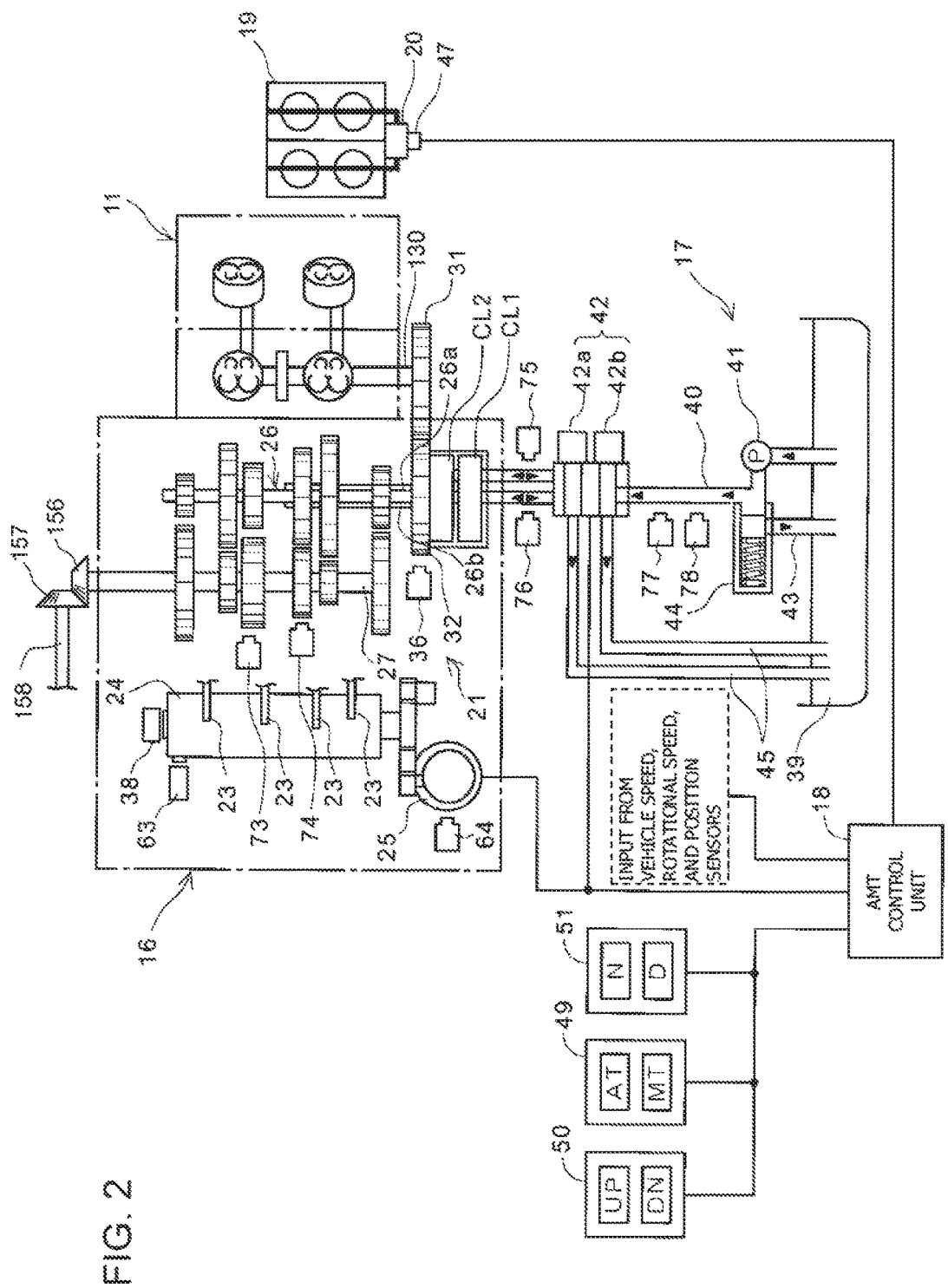
FIG. 2 is a system configuration diagram or an automated manual transmission (AMT) applied to the motorcycle according to the first embodiment, and its peripheral equipment.
Figure 3:
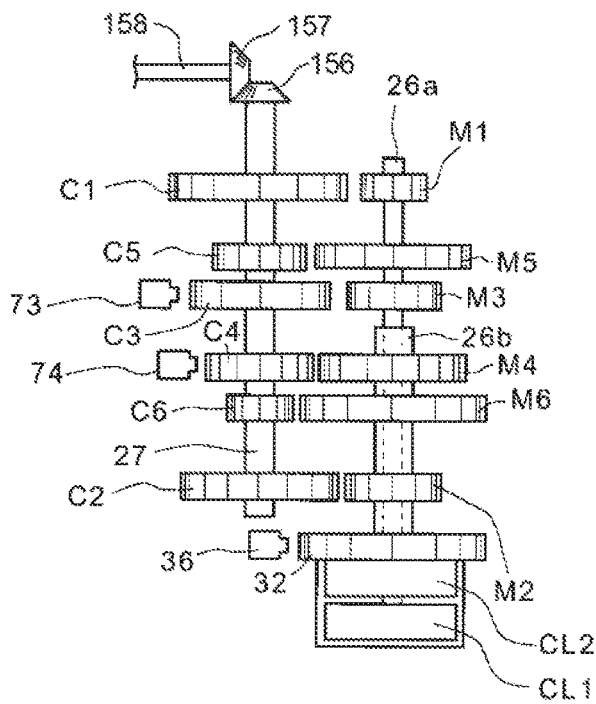
FIG. 3 is a disposition relation diagram representing the meshing relation of each, shaft and transmission gears in the automated manual transmission of FIG. 2.

FIG. 2 is a system configuration diagram of an automated manual transmission (hereinafter referred to as AMT) 16 as an automatic transmission applied to the motorcycle 10A and its peripheral equipment. In addition, FIG. 3 is a disposition relation diagram illustrating a meshing relation of each shaft and transmission gears in the AMT 16. The AMT 16 is a twin clutch type transmission wherein transmission of a rotational driving force of the engine is permitted and interrupted by two clutches disposed on the main shaft 26. The AMT 16 connected to the engine 11 is drive controlled by a clutch hydraulic device 17 and an AMT control unit 18 provided as a speed change controller. The engine 11 has a throttle-by-wire type throttle body 19, which is provided with a throttle opening/closing motor 20.

The AMT 16 includes a six-forward-speed transmission 21, a first clutch CL1, a second clutch CL2, a shift drum 24, and a shift control motor 25 for rotating the shift drum 24. A plurality of gears constituting the transmission 21 are connected to or loosely fitted to the main shaft 26 and the counter shaft 27. The main shaft 26 includes an inner main shaft 26a and an outer main shaft 26b. The inner main shaft 26a is connected to the first clutch CL1, while the outer main shaft 26b is connected to the second clutch CL2. The main shaft 26 and the counter shaft 21 are each provided with transmission gears capable of displacement in the axial direction of the main shaft 26 and the counter shaft 27. End portions of a shift fork 23 are engaged with these transmission gears and a guide groove (not illustrated) formed in the shift drum 24.

A primary driving gear 31 is connected to an output shaft of the engine 11, namely, the crankshaft 130. The primary driving gear 31 is meshed with a primary driven gear 32. The primary driven gear 32 is connected to the inner main shaft 26a through the first clutch CL1, and is connected to the outer main shaft 26b through the second clutch CL2. In addition, the AMT 16 is provided with an inner main shaft rotational speed sensor 73 and an outer main shaft rotational speed sensor 74 which detect rotational speeds of the inner main shaft 26a and the outer main shaft 26b, respectively, by measuring the rotational speeds of predetermined transmission gears on the counter shaft 27.

A bevel gear 156 is connected to an end portion of the counter shaft 27, and the bevel gear 156 is meshed with a bevel gear 157 connected to the drive shaft 158, whereby a rotational driving force of the counter shaft 27 is transmitted to the rear wheel WR. In addition, the AMT 16 is provided therein with an engine rotational speed sensor 36 disposed opposite to the outer periphery of the primary driven gear 32, a gear position sensor 38 for detecting the current gear position on the basis of the rotational position of the shift drum 24, a shifter sensor 64 for detecting the rotation position of a shifter driven by the shift control motor 25, and a neutral switch 63 for detecting that the shift drum 24 is in a neutral position. Besides, the throttle body 19 is provided with a throttle angle sensor 47 for detecting the throttle angle.

The clutch hydraulic device 17 has a configuration wherein a lubricating oil for the engine 11 functions also as a working oil for driving the clutches CL. The clutch hydraulic device 17 includes an oil tank 39, and a pipe line 40 far feeding the oil (working oil) in the oil tank 39 to the first clutch CL1 and the second clutch CL2. A hydraulic pump 41 as a hydraulic pressure source and a valve (electronically controlled valve) 42 as an electric actuator are provided on the pipe line 40, whereas a regulator 44 for maintaining a hydraulic pressure to be supplied to the valve 42 at a fixed level is disposed on a return pipe line 43 connected to the pipe line 40. The valve 42 has such a structure that hydraulic pressures can be individually applied to the first clutch CL1 and the second clutch CL2. In addition, the valve 42 is also provided with return pipe lines 45 for oil.

A pipe line interconnecting a first valve 42a and the first clutch CL1 is provided with a first clutch hydraulic pressure sensor 75 for measuring the hydraulic pressure generated in the first clutch CL1. Similarly, a pipe line interconnecting a second valve 42b and the second clutch CL2 is provided with a second clutch hydraulic pressure sensor 76 for measuring the hydraulic pressure generated in the second clutch CL2.

A mode switch for switching between an automatic transmission (AT) mode and a manual transmission (MT) mode, a shift selection switch 50 for instructing an upshift (UP) or a downshift (DN), and a neutral selection switch 51 for switching between neutral (N) and drive (D) are connected to the AMT control unit 18. The AMT control unit 18 can be realized by a central processing unit (CPU), whereby it is possible to control the valve 42 and the shift control motor 25 and to switch the gear position in the AMT 16 automatically or semi-automatically, according to output signals from the sensors and the switches.

When the AT mode is being selected, the AMT control unit 18 automatically switches the shift position according to such information as the vehicle speed, the engine rotational speed and the throttle angle. On the other hand, when the MT mode is being selected, the AMT control unit 18 shifts the transmission 21 up or down, attendant on an operation of the shift selection switch 50. Note that even when the MT mode is being selected, an auxiliary automatic transmission control for preventing over-rotation or stall of the engine can be carried out. In the clutch hydraulic device 17, a hydraulic pressure is exerted on the valve 42 by the hydraulic pump 41, and this hydraulic pressure is controlled by the regulator 44 so as not to exceed an upper limit. When the valve 42a or 42b is opened by an instruction from the AMT control unit 18, a hydraulic pressure is applied to the first clutch CL1 or the second clutch CL2, so that the primary driven gear 32 is connected to the inner main shaft 26a or the outer main shaft 26b through the first clutch CL1 or the second clutch CL2. On the other hand, when the valve 42 is closed and the application of the hydraulic pressure is stopped, the first clutch CL1 and the second clutch CL2 are biased, by return springs (not illustrated) incorporated therein in directions for disconnection from the inner main shaft 26a and the outer main shaft 26b.

The valve 42 for driving the clutches by opening and closing pipe lines connecting the pipe line 40 to the clutches CL1 and CL2 is so configured that the time of transition from a fully closed state to a fully opened state of the pipe lines or the like can be arbitrarily changed by the AMT control unit 18 on the basis of a driving signal.

The shift control motor 25 rotates the shift drum 24 according to an instruction from the AMT control unit 18. When the shift drum 24 is rotated, the shift fork 23 is displaced in the axial direction of the shift drum 24 according to the shape of the guide groove formed in the outer periphery of the shift drum 24. Attendant on this, gear meshing on the counter shaft 27 and the main shaft 26 is changed, whereby an upshift or downshift of the transmission 21 is carried out.

The AMT 16 according to this embodiment is so configured that the inner main shaft 26a connected to the first clutch CL1 supports odd-numbered speed gears (first, third, and fifth speeds), whereas the outer main shaft 26b connected to the second clutch CL2 supports even-numbered speed gears (second, fourth, and sixth speeds). Therefore, for example, while the vehicle is traveling with an odd-numbered speed gear, the supply of the hydraulic pressure to the first clutch CL1 is continued and the engaged state of the first clutch CL1 is maintained. At the time when a shift change is conducted, gear meshing is preliminarily changed by rotation of the shift drum 24, whereby it is possible to complete the shift operation by only switching the engagement states of the clutches.

Referring also to FIG. 3, the inner main shaft 26a connected to the first clutch CL1 supports odd-numbered speed driving gears M1, M3, and M5. The first-speed driving gear M1 is formed to be integral with the inner main shaft 26a In addition, the third-speed driving gear M3 is so mounted as to be slidable in the axial direction and non-rotatable in the circumferential direction, and the fifth-speed driving gear MB is so mounted as to be non-slidable in the axial direction and rotatable in the circumferential direction. On the other hand, the outer main shaft 26b connected to the second clutch CL2 supports even-numbered speed driving gears M2, M4, and M6. The second-speed driving gear M2 is formed to be integral with the outer main shaft 26b. Besides, the fourth-speed driving gear M4 is so mounted as to be slidable in the axial direction and non-rotatable in the circumferential direction, while the sixth-speed driving gear M6 is so mounted as to be non-slidable in the axial direction and rotatable in the circumferential direction.

In addition, the counter shaft 21 supports driven gears C1 to C6 which are meshed with the driving gears M1 to M6. The first-speed to fourth-speed driven gears C1 to C4 are so mounted as to be non-slidable in the axial direction and rotatable in the circumferential direction, while the fifth-speed and sixth-speed driven gears C5 and C6 are so mounted as to be slidable in the axial direction and non-rotatable in the circumferential direction. In the AMT 16, out of the gears in rows, the driving gears M3 and M4 and the driven gears C5 and C6, or the gears slidable in the axial direction, are slid by the shift fork 23, so as to engage or disengage dog clutches, thereby performing a shift operation.

In the AMT 16, for example, when the first-speed gears are selected, the relational driving farce of the engine transmitted from the Crankshaft 130 to the primary driven gear 32 is transmitted to the inner main shaft 36a through the engagement of the first clutch CL1, and is transmitted from the first-speed driving gear M1 to the counter shaft 27 through the first-speed driven gear C1. In this instance, a first-speed dog clutch is in a meshed state between the first-speed driven gear C1 and the fifth-speed driven gear C5.

In addition, in the AMT 16, when the rotational driving force is being transmitted through the first-speed gears, "preliminary shift" of meshing a second-speed dog clutch, namely, a dog clutch between the sixth-speed driven gear C6 and the second-speed driven gear C2 to thereby prepare for a shift to the second gear position can be carried out. In this instance, since the second clutch CL2 is in a disengaged state, even when the second-speed dog clutch is meshed during traveling with the first-speed gears, the rotational driving force of the engine only causes idling of the outer main shaft 26b through the second-speed driving gear M2. When the clutch engagement state is changed from the first clutch CL1 to the second clutch CL2 after this preliminary shift, the rotational driving force can be outputted from the counter shaft 27 through the second-speed gear instantaneously, without any interruption.

On the shift drum 24 of the AMT 16, "neutral standby" positions for setting in a neutral state the group on the side of non-transmission of the rotational driving force, out of the group of even-numbered speed gears or the group of odd-numbered speed gears, are set between predetermined rotational positions for selection of the gear positions. Therefore, it is possible to set the odd-numbered speed gears into a neutral state during running with an even-numbered speed gear pair, and to set the even-numbered speed gears into a neutral state during running with an odd-numbered speed gear pair.

Figure 4:
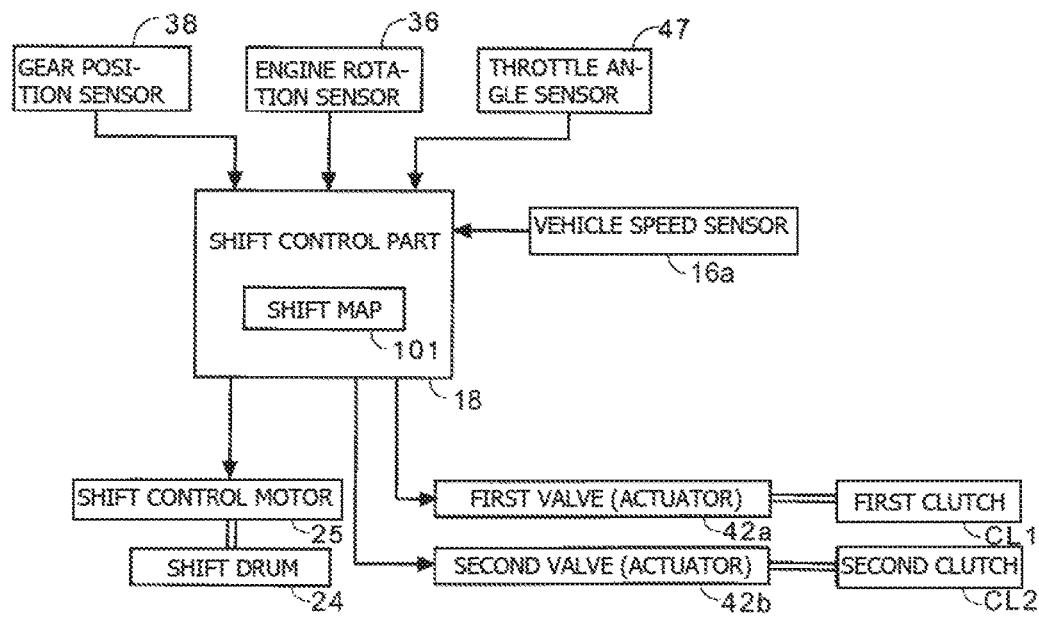
FIG. 4 is a block diagram illustrating the configuration of an AMT control unit according to the first embodiment and its peripheral equipment.

FIG. 4 is a block diagram illustrating the configuration of the &MT control unit 18 according to the first embodiment of the present invention and its peripheral equipment. The same reference symbols as above denote the same or equivalent parts to the above-mentioned. The AMT control unit 18 has a shift map 101 stored therein, and performs shift control by referring to the shift map 101. During normal running of the vehicle 10A, the AMT control unit 18 drives the shift control motor 25 and the valve 42 (42a, 42b) according to the shift map 101 including a three-dimensional map or the like, on the basis of output information from the gear position sensor 38, the engine rotational speed sensor 36 and the throttle angle sensor 47 as well as vehicle speed information obtained by the vehicle speed sensor 16a, to thereby perform a shift operation in conjunction with clutch control (electronic control of clutch capacity). In addition, on the basis of the information, the AMT control unit 18 performs engagement control inclusive of partial clutch engagement control (in other words, electronic control of clutch capacity) so as to enable smooth transmission of the driving force, at the time of starting of the vehicle 10A.

Here, where only automatic clutch control by the AMT control unit 18 is conducted, a problem may be generated. Specifically, turning-ON/OFF of the driving force by the automatic clutch control in an extremely low speed region, or the like may generate an uncomfortable feeling in the driver, although the automatic clutch control is so set that the driving force is transmitted as smoothly as possible. In the present disclosure, particularly, automatic brake control by the brake controller 1 is performed in conjunction with the automatic clutch control by the AMT control unit 18, whereby the driver's uncomfortable feeling is reduced.

Figure 5:
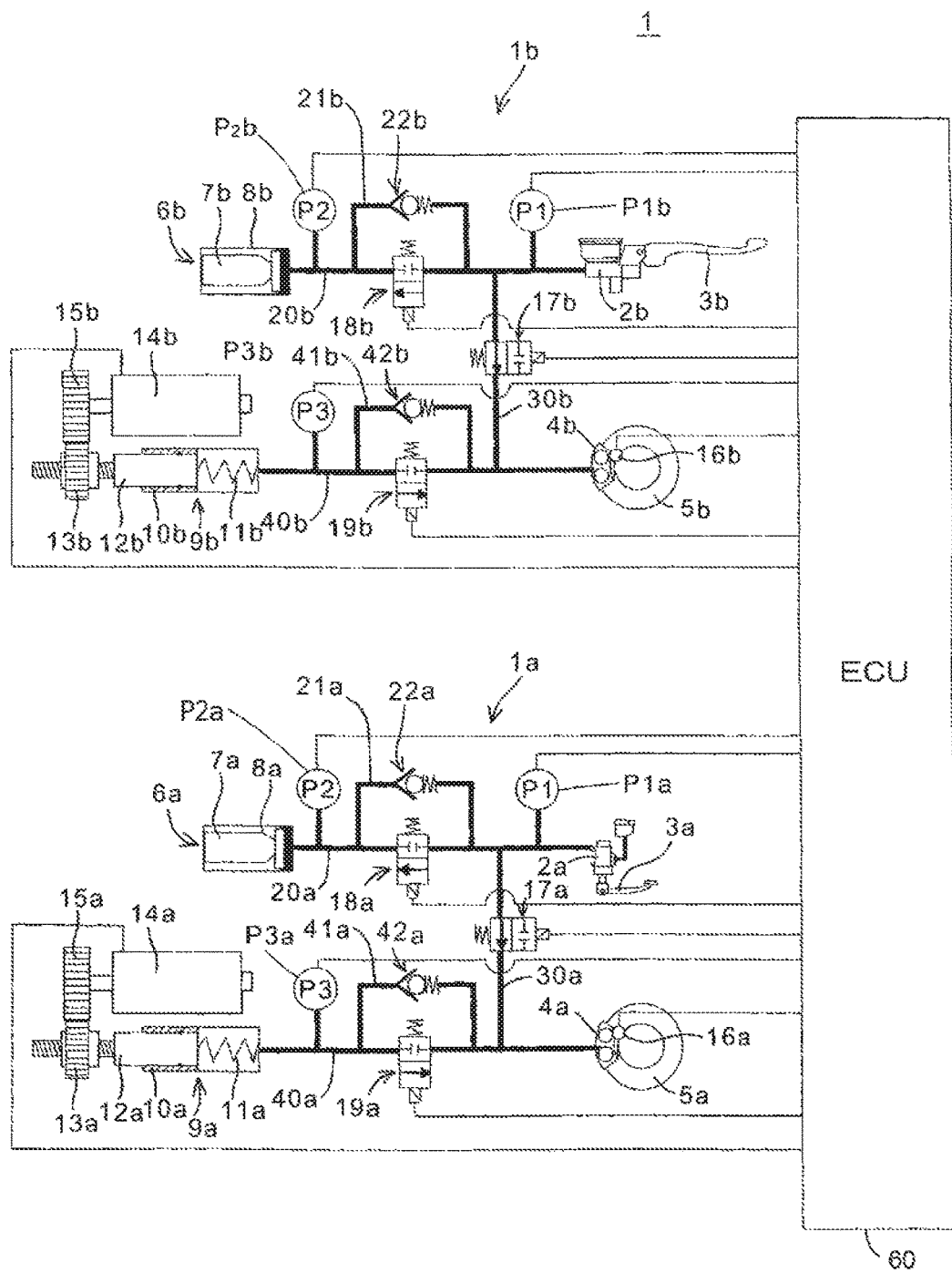
FIG. 5 is a hydraulic pressure system diagram of the brake controller of the motorcycle according to the first embodiment.

FIG. 5 is a hydraulic pressure system diagram of the brake controller of the motorcycle 10A according to the first embodiment of the present invention. The brake controller 1 includes a rear wheel side brake circuit 1a and a front wheel side brake circuit 1b which, are independent from each other, and an engine control unit (ECU) 60 as control means for controlling the brake circuits 1a and 1b.

In FIG. 5, each component of the brake controller 1 is denoted by a symbol including a numeral and a small letter of alphabet used as a sign. The same numerals indicate the equivalent parts in the front-wheel and rear-wheel brake circuits, and sign "a" indicates the components on the rear wheel side, while sign "b" indicates the components on the front wheel side. The brake circuits 1a and 1b are configured in the same manner, except for a brake operating part 3 including the brake pedal 3a and a brake lever 3b; therefore, the descriptions of the configuration concerning the brake circuits 1a and 1b will be represented by the description of the rear wheel side brake circuit 1a.

A driver's brake operation on the rear wheel side is conducted by stepping on the brake operating part (brake pedal) 3a attached to a foot rest (not illustrated in FIG. 5), whereas a driver's brake operation on the front wheel side is performed by gripping the brake operating part (brake lever) 3b attached to the steering handle 118 (FIG. 1).

The brake circuit 1a has a hydraulic (oil pressure) circuit for operating the brake caliper 4a by a pressure transmitted by the working fluid (brake fluid). This brake circuit 1a is configured as a brake-by-wire (BBW) system. The brake-by-wire system is not a system wherein a hydraulic pressure generated in the master cylinder 2a by operating the brake pedal 3a is supplied directly to the brake caliper 4a, but a system wherein the hydraulic pressure generated in the master cylinder 2a is detected by a pressure sensor (P1a or P2a to be described later) and a hydraulic modulator 9a is driven on the basis of the detection output value to thereby operate the brake caliper 4a.

For the brake controller 1, a front-wheel/rear-wheel individual system can be adopted wherein an operation of the brake pedal 3a causes an operation of the rear-wheel brake circuit 1a only. Also, a front-wheel/rear-wheel interlock system can be adopted wherein not only the rear-wheel brake circuit 1a but also the front-wheel brake circuit 1b is automatically operated in response to the operation of the brake pedal 3a Besides, the brake controller 1 also has an antilock brake system (ABS) function of preventing lockup of the wheel by instantaneously and intermittently releasing the action of a braking force, notwithstanding the driver's operation. Further, the brake controller 1 can be provided with a fail-safe function such that when the hydraulic modulator 9a or the like is troubled, lines are changed over to supply the hydraulic pressure generated by the master cylinder 2a to the brake caliper 4a directly, thereby enabling a normal brake operation which is not based on the brake-by-wire system.

When supplied with a hydraulic pressure from the hydraulic modulator 9a, the brake caliper 4a presses a brake pad (not illustrated) as a frictional body against a brake disk 5a to generate a frictional force between them. By this frictional force, a braking force is applied to the wheel being rotated as one body with the brake disk 5a, whereby the vehicle body is decelerated. The brake caliper 4a is provided with the vehicle speed sensor 16a for detecting the vehicle speed of the motorcycle 10A from the rotational speed of the wheel.

The master cylinder 2a and the brake caliper 4a are interconnected by a main piping 30a equipped with a normally open type (NO type) third solenoid valve 17a. In the following description, taking the third solenoid valve 17a as a boundary, the master cylinder 2a side will be referred to as the input side of brake circuit, and the brake caliper 4a side will be referred to as the output side of brake circuit.

The master cylinder 2a and the brake caliper 4a are interconnected by the main piping 30a through the third solenoid valve 17a The main piping 30a is connected to a first branched pipe 20a on the input side of brake circuit. To the first branched pipe 20a, a fluid loss simulator 6a is connected through a normally closed type (NC type) first solenoid valve 18a. The fluid, loss simulator 6a causes a pseudo hydraulic reaction force according to an operation amount of the brake pedal 3a to act on the master cylinder 2a when the third solenoid valve 17a is turned ON and the main piping 30a is closed. The first solenoid valve 18a makes the master cylinder 2a and the fluid loss simulator 6a communicate with each other by opening the first branched pipe 20a when a brake operation is conducted by the driver.

The fluid loss simulator 6a has a resin spring 7a as an elastic member disposed on the rear side of a hydraulic piston slidably accommodated in a cylinder 8a. The fluid loss simulator 6a is a device for generating a hydraulic reaction force at the master cylinder 2a by a resilient force of the resin spring 7a when a hydraulic pressure by the master cylinder 2a is supplied through the first branched pipe 20a By this structure, an operation reaction force is generated on the brake pedal 3a, whereby an operation feeling corresponding to a braking operation force can be given to the driver. Note that a metallic spring or the like may be used as the elastic member disposed in the fluid loss simulator 6a; further, the relation between a stroke amount of the brake pedal 3a and the operation reaction force can be adjusted arbitrarily by, ion example, combining a plurality of elastic members differing in resilient force.

The first branched pipe 20a is provided with, a bypass passage 21a bypassing the first solenoid valve 18a. The bypass passage 21a is equipped with a check valve 22a which permits the working fluid to flow in a direction from the fluid loss simulator 6a side toward the master cylinder 2a.

A second branched pips 40a is connected to that portion of the main piping 30a which is on the output side of brake circuit. To the second branched pipe 40a, the hydraulic modulator 9a is connected through a normally closed type (NC type) second solenoid valve 19a. The hydraulic modulator 9a generates a hydraulic pressure to be supplied to the brake caliper 4a, by pressing a hydraulic piston 12a disposed inside a cylinder 10a by a driving force of a motor 14a provided as an actuator.

When the motor 14a of the hydraulic modulator 9a is rotationally driven by a driving command from the ECU 60, a driving gear 15a and a driven gear 13a meshed therewith are rotationally driven. Between the driven gear 13a and the piston 12a, there is provided a feed screw mechanism for conversion of a rotating motion into a rectilinear motion. By rotating the motor 14 in a predetermined direction at a current value determined by a predetermined duty ratio, at arbitrary hydraulic pressure is generated in the second branched pipe 40a.

In the cylinder 10a, there is disposed a return spring 11a that gives a resilient force in a direction for returning the piston 12a into an initial position. The piston 12a can be returned into the initial position by reversely rotating the motor 14a. In addition, a configuration may be adopted wherein the piston 12a is returned into the initial position by the resilient force of the return spring 11a, even without driving the motor 14a.

The second branched pipe 40a is provided with a bypass passage 41a bypassing the second solenoid valve 19a. The bypass passage 41a is equipped with the check valve 42a that permits the working fluid to flow in a direction from the hydraulic modulator 9a side toward the brake caliper 4a.

The first pressure sensor P1a and the second pressure sensor P2a are provided on the input side of brake circuit. On the other hand, a third pressure sensor P3a is provided on the output side of brake circuit. The first pressure sensor P1a and the second pressure sensor P2a on the input side detect an operation amount of the brake pedal 3a. Besides, the third pressure sensor P3a on the output side detects a hydraulic pressure in the brake caliper 4a that is necessary for feedback control of the motor 14a.

The first pressure sensor P1a is provided on the main piping 30a between the master cylinder 2a and the third solenoid valve 17a, and the second pressure sensor P2a is provided on the first branched pipe 20a between the fluid loss simulator 6a and the first solenoid valve 18a. The third pressure sensor P3a is provided on the second branched pipe 40a between the hydraulic modulator 9a and the second solenoid valve 19a. As the second pressure sensor P2a, a pressure sensor higher in resolution and detection accuracy than the first pressure sensor P1a and the third pressure sensor P3a is used.

Output signals from the first to third pressure sensors P1a to P3a are inputted to the ECU 60. On the basis of the output signals from the first pressure sensor P1a, the second pressure sensor P2a, the third pressure sensor P3a and the vehicle speed sensor 16a, the ECU 60 controls the opening/closing of the first solenoid valve 18a, the second solenoid valve 19a and the third solenoid valve 17a and rotationally drives the motor 14a, whereby an appropriate drive control of the front and rear brakes of the motorcycle can be performed.

In this embodiment, the two pressure sensors P1a and P2a are provided on the input side on which the brake operation force is detected. This configuration enables the brake control by the hydraulic modulator 9a to be continued even when either one of the two pressure sensors P1a and P2a is troubled. In addition, with the two pressure sensors P1a and P2a provided on the input side, failure diagnosis for the sensors can be carried out by comparing the output values of the sensors, even while the third solenoid valve 17a is in a closed state and the input side and the output side are isolated from each other.

Examples of brake circuit operation while the vehicle is stopped and while the vehicle is traveling will be described. Here, an operation wherein the front and rear wheels are individually controlled will be described by illustrating an example concerning the rear brake, but a front-wheel/rear-wheel interlock brake operation is also possible.

When the vehicle is in a stopped state, the third solenoid valve 17a is in an open state, the first solenoid valve 18a is in a closed state, and the second solenoid valve 19a is in a closed state. When the vehicle starts traveling, rotational speeds of the front and rear wheels detected by the vehicle speed sensors 16a are inputted to the ECU 60. The vehicle speed is calculated on the basis of the higher one of the rotational speeds of the front and rear wheels. When it is detected that the vehicle speed has reached or exceeded a running determination value (for example, 5 km/hour), the first solenoid valve 18a is switched over to an open state, resulting in a standby state while the third solenoid valve 17a is energized to be switched over to a closed state. As a result, the master cylinder 2a and the fluid loss simulator 6a communicate with each other. In the standby state, the second solenoid valve 19a is in a closed state (non-energization state). The standby state is maintained until a braking operation by the driver is conducted.

When the vehicle is in a stopped state or the vehicle speed is less than the running determination value (hereinafter referred to as "while the vehicle is stopped"), the first to third solenoid valves 17a, 18a and 19a are in a non-energization state. Therefore, while the vehicle is stopped, a hydraulic pressure generated in the master cylinder 2a according to the operation amount of the brake pedal 3a is transmitted through the main piping 30 and exerted on the brake caliper 4a, generating a braking force. In other words, while the vehicle is stopped, the braking force is applied not by the brake-by-wire system but in a direct manner.

In the case where the driver steps on the brake pedal 3a and a hydraulic pressure of not less than a predetermined value is generated in the master cylinder 2a in the standby state, the ECU 60 detects that the braking operation has been started, on the basis of an output signal from the first pressure sensor P1a or the second pressure sensor P2a. Then, the ECU 60 energizes the second solenoid valve 19a, to cause the hydraulic modulator 9a and the brake caliper 4a to communicate with each other. Concurrently, the ECU 60 drives the motor 14a, to supply a predetermined hydraulic pressure to the brake caliper 4a.

While a hydraulic pressure is being supplied to the brake caliper 4a by the hydraulic modulator 9a, the third solenoid valve 17a is in a closed state, and a variation in hydraulic pressure due to the operation of the hydraulic modulator 9a is not transmitted to the brake pedal 3a. Therefore, a brake operation feeling simulatively reproduced by the fluid loss simulator 6a is generated on the brake pedal 3a when the brake is operated, the variation in hydraulic pressure at the hydraulic modulator 9a is not transmitted to the brake pedal 3a, and, accordingly, an operation reaction force attendant on the operation, of the ABS is also not generated.

Thus, according to the brake device for the vehicle in this embodiment, when the vehicle reaches a predetermined vehicle speed, the standby state is established wherein the third solenoid valve 17a is in a closed state and the first solenoid valve 18a is in an open state. Therefore, the input side of brake circuit can be kept separate from the output side of brake circuit, during the traveling of the vehicle. As a result, the operation stroke at the time of brake operation can be stabilized.

The hydraulic pressure generated in the master cylinder 2a is not transmitted to the second pressure sensor P2a, unless the switching to the standby state occurs and the first, solenoid valve 18a is put into an open state. Therefore, even in the case where a large operation force is given to the brake pedal 3a while the vehicle is stopped and an excessive hydraulic pressure is generated in the master cylinder 2a, this hydraulic pressure is not transmitted to the second pressure sensor P2a. Consequently, in the standby state, the second pressure sensor P2a which is enhanced in resolution and which is used for enhancing the detection accuracy for the brake operation force can be protected from an excessive hydraulic pressure.

Figure 6:
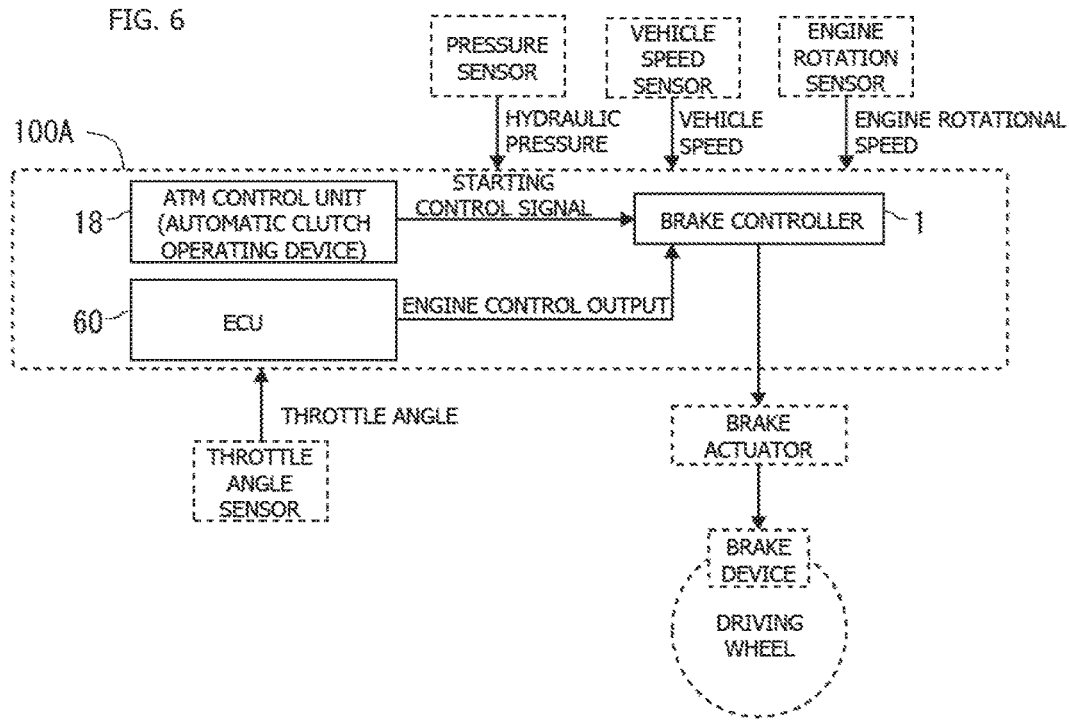
FIG. 6 illustrates a main part of a system configuration for realizing a reduction in the driver's uncomfortable feeling in the first embodiment.

FIG. 6 illustrates a main part of a system configuration for realizing a reduction in the driver's uncomfortable feeling in the first embodiment. A system 100A includes the brake controller 1 described referring to FIG. 5 and the like, the AMT control unit 18 described referring to FIG. 4 and the like, and the ECU 60 described referring to FIG. 5 and the like. While an operation of the system 100A for realizing a reduction in the uncomfortable feeling can be carried out by various working examples as will be described later referring to FIGS. 7 and 9, a fundamental operation can toe as follows.

When the driver is about to start the vehicle 10A, the AMT control unit 18 performs such a control as to automatically switch over the starting clutch from a disengaged state to an engaged state, as has been described referring to FIG. 4. (Note that while the "AMT control unit 18" performs an automatic clutch switching control and control of the transmission in an interlocked manner as has been described referring to FIG. 4, the unit will be referred to as the "automatic clutch operating device 18" when attention is paid to the automatic clutch switching control.)

Here, while performing starting control for the vehicle 10A by conducting automatic engagement control of the clutches as above-mentioned, the automatic clutch operating device 18 sends to the brake controller 1 a starting control signal to which the fact that the starting control is under way is reflected, as illustrated in FIG. 6. Upon receiving the starting control signal, the brake controller 1 operates the brake actuator to operate the brake device by an appropriate amount for a short time, thereby decelerating the rotation of the driving wheel.

Thus, in the present disclosure, in a situation wherein automatic engagement of the clutch conducted at the time of starting the vehicle 10A causes an abrupt change in the driving wheel torque to cause the driver to get an uncomfortable feeling, the brake controller 1 automatically operates the brake device to decelerate the driving wheel. Therefore, the abrupt change in the driving wheel torque and the like can be relaxed by the automatic brake control, whereby the driver's uncomfortable feeling can be reduced.

Note that the starting control signal is specifically one or a combination of such signals as engine rotational speed acquired by the sensors and the like, and a rule-based determination (decision) in regard of the value of the signal is made in the brake controller 1, thereby making it possible to infer that automatic engagement control on the clutches is being conducted by the automatic clutch operating device 18. A determination (decision) step or steps in FIGS. 7 and 9 to be described later represent an example of utilization of the starting control signal.

Note that the brake actuator for actuating the brake controller 1 corresponds to the motor 14a in FIG. 5 described hereinabove, and the brake device driven by the brake actuator (motor 14a) corresponds to the brake caliper 4a in FIG. 5. In addition, in order that driving (supply of a hydraulic pressure) of the brake device (brake caliper 4a) can be performed by the brake actuator (motor 14a) and the driving wheel WR can thereby be decelerated, the brake controller 1 preliminarily sets the brake circuit in FIG. 5 into the following state. Specifically, the third solenoid valve 17a is preliminarily set in a closed state, the first solenoid valve 18a in an open state, and the second solenoid valve 19a in an open state, (Hereinafter, this state of the brake circuit will be referred to as the "automatic brake control possible state.")

In other words, the "automatic brake control possible state" corresponds to a state reached in the case where the vehicle speed has reached a predetermined vehicle speed to obtain a standby state in the description made referring to FIG. 3 and then, further, the driver has stepped on the brake pedal 3a to cause a hydraulic pressure of not less than a predetermined value to be generated in the master cylinder 2a. At the time of carrying out the drake control in the present disclosure, a special processing is conducted wherein the automatic brake control possible state is preliminarily set, without waiting for the arrival at the predetermined vehicle speed and the driver's brake operation. Here, it is sufficient that in the brake controller 1, the brake circuit is set in the automatic brake control possible state constantly while it is determined that the starting control signal is being received. Conversely, while it is determined that the starting control, signal is not being received, such as while the vehicle is stopped or during running at a high speed of not less than, a predetermined speed, it is unnecessary to specially set the brake circuit in the automatic brake control possible state as above-mentioned, and it is sufficient to carry out the brake control, in the description made referring to FIG. 5.

In addition, in the case where the ECU 60 is so set as to perform a throttle-by-wire (TBW) operation, a control may be carried out under the TBW operation at the time when the brake controller 1 performs the automatic brake control in the above-mentioned manner. For instance, in the case where the driver makes a sudden operation of a throttle grip at the time of starting of the vehicle 10A, a control such that the throttle angle would not become excessively large may be conducted fey the TBW operation and, in addition, the automatic brake control by the brake controller 1 may also be performed concurrently.

Figure 7:
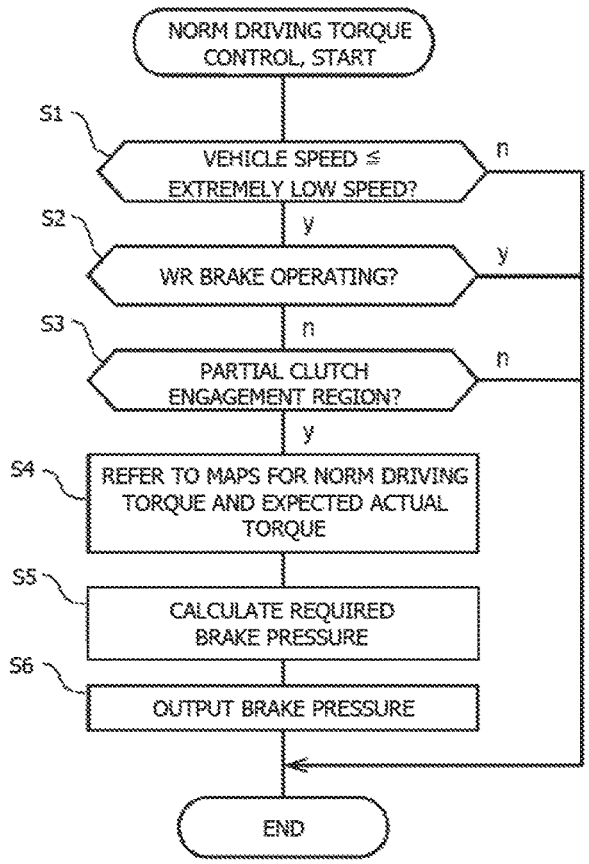
FIG. 7 is a flow chart of an operation of the system according to a first example.

FIG. 7 is a flow chart of an operation of the system 100A according to s first example, illustrating an operation example in the case of performing a norm driving torque control at the time of an extremely low vehicle speed. Steps S1 to S6 are as follows.

In step S1, it is determined whether or not the vehicle speed is in an extremely low speed region, by referring to the vehicle speed, outputted from the vehicle speed sensor 16a. If the determination is affirmative, the control proceeds to step S2, whereas if the determination is negative, the flow of FIG. 7 is ended. Here, it is sufficient that the vehicle speed outputted by the vehicle speed sensor 16a is compared with a predetermined threshold (for example, 10 km/hour) for determination of extremely low speed, and an affirmative determination is obtained if the vehicle speed is not higher than the threshold, whereas a negative determination is obtained if the vehicle speed is higher than the threshold.

In step S2, whether or not the driver is stepping on the brake pedal 3a to perform a brake operation on the rear wheel WR serving as a driving wheel is determined, by referring to an output signal from the first pressure sensor P1a or the second pressure sensor P2a (hydraulic pressure). If the determination is negative, the control proceeds to step S3, whereas if the determination is affirmative, the flow of FIG. 7 is ended. Here, it is sufficient that a negative determination, that a brake operation is not being conducted, is made if the hydraulic pressure is not higher than a predetermined threshold for determination (decision), whereas an affirmative determination that a brake operation is being conducted is made if the hydraulic pressure is higher than the threshold.

In step S3, whether or not the clutch is in a partial clutch engagement rotation region is determined by referring to the hydraulic pressure or stroke amount of the clutch. If an affirmative determination is obtained, the control proceeds to step S4, whereas if a negative determination is obtained, the flow of FIG. 7 is ended.

Note that the partial clutch engagement rotation region may be preliminarily defined as a predetermined engine rotational speed region in which the automatic clutch operating device 18 can automatically engage the clutch, in such a manner as to obtain an affirmative determination if an engine rotational speed obtained by reference is in the predetermined engine rotational speed region, and to obtain a negative determination if the engine rotational speed is not in the region. In this case, it is sufficient that a predetermined region according to the vehicle is preliminarily set as the partial clutch engagement rotation region. For example, for a specific vehicle, a predetermined vicinity (e.g., ±500 rpm) of 2,000 rpm, that is, a rotation region from 1500 rpm to 2,500 rpm can be preliminarily set as the partial clutch engagement rotation region.

In step S4, the brake controller 1 calculates a norm driving torque at the time and an expected actual torque toy referring to a prescribed norm driving torque map (not illustrated) and an expected actual torque map (not illustrated), and then the control proceeds to step S5.

Here, it is sufficient for the norm driving torque map and the expected actual torque maps to be prepared as predetermined maps such that a norm driving torque and an expected actual torque can be obtained as output numerical values when an engine rotational speed detected by the engine rotational speed sensor 36, a clutch hydraulic pressure detected by a first clutch hydraulic pressure sensor 75 or a second clutch hydraulic pressure sensor 76, a vehicle speed detected by the vehicle speed sensor 16a, and a throttle angle detected toy the throttle angle sensor 47 are given as input numerical values. The norm driving torque map and the expected actual torque map can be set by experiments or calculations.

Note that a control current for a linear solenoid in the first valve 42a or the second valve 42b may be used as an input, in place of the clutch hydraulic pressure. In addition, while a map such that the norm driving torque and the expected actual torque are respectively given for the four parameters of the engine rotational speed, the clutch hydraulic pressure (or clutch, control current), the vehicle speed and the throttle angle is prepared in the above description, a map such that arbitrary part of the four parameters is inputted may be used.

Note that the clutch hydraulic pressure (or clutch control currents and the throttle angle are parameters associated with a control clutch, capacity for a variable capacity clutch controlled by the automatic clutch operating device 18; therefore, by preparing an appropriate map, it is possible in the present disclosure to perform brake control while taking the control clutch capacity into account. Besides, the engine rotational speed and the throttle angle are parameters associated with an engine control output for tee engine 11 controlled by the ECU 60; therefore, by preparing an appropriate map, it is possible in the present disclosure to perform brake control while taking the engine output into account.

In addition, while the hydraulic type clutch is used in the example of FIG. 2, a mechanical clutch is also applicable in the present disclosure, in this case, it is sufficient to use, for example, clutch operation amount of a mechanical clutch, in place of the clutch hydraulic pressure (or clutch control current), as a parameter associated with the control clutch capacity.

In step S5, the brake controller 1 calculates a brake pressure necessary for the rear wheel WR (serving as a driving wheel) for the purpose of braking the expected actual torque obtained in step S4 to the norm driving torque obtained in step S4, and then the control proceeds to step S6.

In step S6, the brake controller 1 executes a control of driving the brake actuator (motor 14a) so as to generate the brake pressure obtained in step S5 at the brake caliper 4a for the rear wheel WR, and then the flow is ended.

The whole of the flow of FIG. 7 as above is carried out at each moment when the system 100A is operating, and the brake control by the brake controller 1 is performed as required and at a required strength at each moment, whereby the driver's uncomfortable feeling can be reduced.

Note that as has been described above, in order to carry out the determination in step S2 and to generate the brake pressure in step S6, the brake circuit described referring to FIG. 5 is preliminarily set in the aforementioned automatic brake control possible state. Conversely, while a condition where the negative determination is obtained in step S1, a condition where the affirmative determination is obtained in step S2 or a condition where the negative determination is obtained in step S3 is continued, it is sufficient to carry out the brake control by the technique described referring to FIG. 5, without performing the brake control according to the present disclosure.

Figure 8:
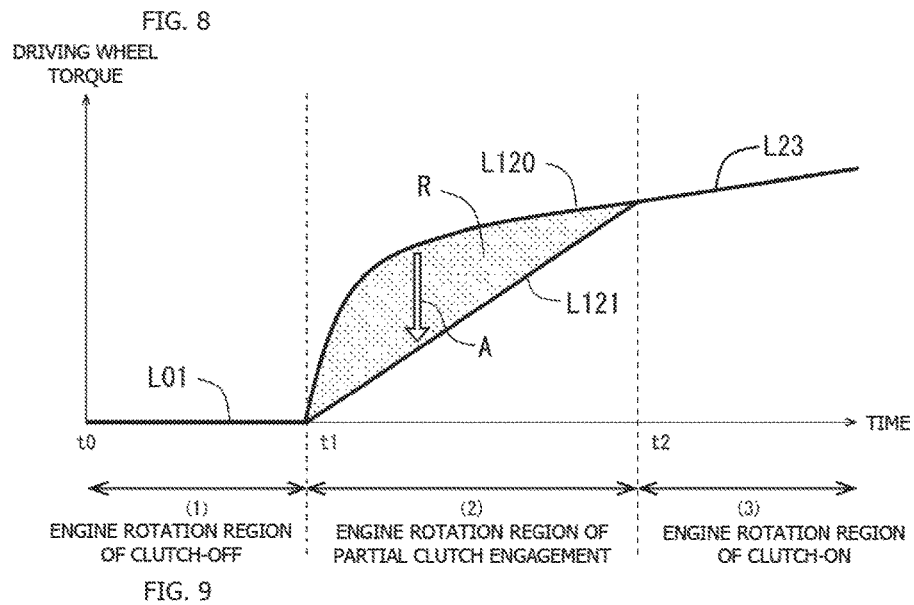
FIG. 8 is a diagram for schematically explaining an effect of the brake control according to the flow of FIG. 7

FIG. 8 is a diagram for schematically explaining an effect of the brake control by the flow of FIG. 7. Specifically, FIG. 8 illustrates a graph representing the relation between lapse of time and driving wheel torque at the time when the throttle angle is kept at a predetermined angle in the vehicle 10A, starting from the stopped state of the vehicle. Out of the graph starting from time t0 and changing at time t1 and time t2, a combination of lines L01, L120 and L23 represents a graph in the case where the brake control of FIG. 7 in the present disclosure is not applied (the graph referred to as "conventional graph") as a comparative example. On the other hand, a combination of lines L01, L121 and L23 is an example of a graph in the case where the brake control of FIG. 7 in the present disclosure is applied (the graph referred to as "brake control graph"). Note that the lapse of time on the axis of abscissas in FIG. 8 is an enlarged expression of a very short time (approximately one second to approximately two seconds in total width), and the brake control of the present disclosure is executed for a further shorter time.

Specifically, the conventional graph and the brake control graph share a common behavior in a period from time t0 to time t1 when the engine rotational, speed is in the clutch-OFF region and the driving wheel torque is not generated as illustrated in (1), and in a period after time t2 when the engine rotational speed has become high and in the clutch-ON region as illustrated in (3).

Besides, in a period from time t1 to time t2 as illustrated in (2) when the engine rotational speed is in the partial clutch engagement rotation region and the automatic clutch switching control by the automatic clutch operating device 18 is conducted so that the driving wheel torque is increasing from zero, the conventional graph illustrates that an uncomfortable feeling may be generated in the driver due to an abrupt rise in torque in a short time as indicated by the line L120. On the other hand, in the same period, the brake control graph obtained by application of the brake control of FIG. 7 in the present disclosure illustrates a smooth rise in torque as indicated by the line L121, meaning that the driver's uncomfortable feeling can be reduced. In other words, the region R surrounded by the line L120 relevant to the related art and the line L121 relevant to the present application represents a surplus torque which causes the torque-associated uncomfortable feeling in the related art; according to the present application, on the other hand, the region R of the uncomfortable feeling can be eliminated as indicated by arrow A.

Here, the line L120 of the conventional graph corresponds to a curve obtained by plotting against time the torque obtained as a result of reference to the expected actual torque map in step S4 of FIG. 7. Besides, the line L121 of the brake control graph corresponds to a curve obtained by plotting against time the torque obtained as a result of reference to the norm driving torque map in step S4 of FIG. 7.

Therefore, as the expected actual torque map to be referred to in step S4, a predetermined map may be preliminarily prepared such as to indicate an actual driving wheel torque in the case where the brake control of the present disclosure is not applied at all to an automatic clutch vehicle. Similarly, as the norm driving torque map to be referred to in step S4, a predetermined map may be preliminarily prepared such as to indicate a norm driving torque smaller than the expected actual torque, thereby indicating the reduction in the uncomfortable feeling that would, be generated in the expected actual torque map.

In addition, the brake pressure to be calculated in step S5 may be prepared as a brake pressure necessary for braking the torque in the expected actual torque map down to the torque in the norm driving torque map. Specifically, the brake pressure to be calculated may be prepared as maps concerning the engine rotational speed, the clutch hydraulic pressure (or clutch control current), the vehicle speed, the throttle angle, etc., like the expected actual torque map and the norm driving torque map. Alternatively, a predetermined brake pressure may be obtained in step S5 as a brake pressure that is proportional, to the difference (a torque difference corresponding to the uncomfortable feeling) obtained by subtracting the norm driving torque from the expected actual torque obtained by reference of each map, or as a brake pressure obtained by application of a predetermined function to the torque difference.

Figure 9:
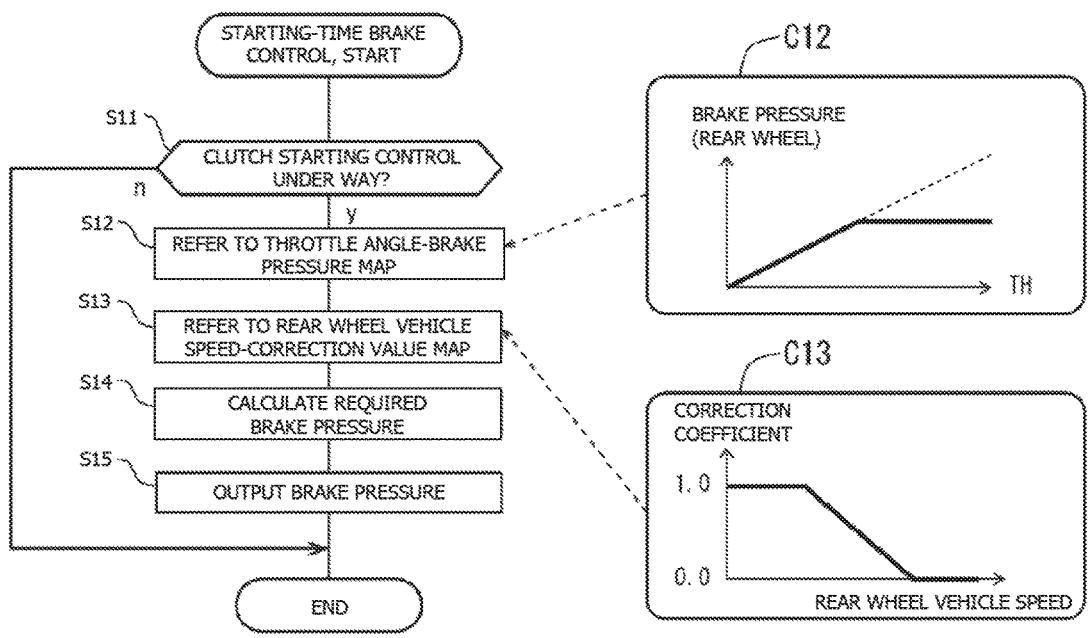
FIG. 9 is a flow chart of an operation of a system according to a second example.

FIG. 9 is a flow chart of an operation of a system 100A according to a second example, as a modification example of the first example illustrated in FIG. 7, indicating an operation example in the case where brake control at the time of vehicle starting is only conducted. Steps S11 to S15 are as fellows. Note that columns C12 and C13 illustrate examples for schematically explaining steps S12 and S13 of the flow.

In step S11, it is determined whether or not the automatic clutch operating device 18 is performing a clutch starting control. If the determination is affirmative, the control proceeds to step S12, whereas if the determination is negative, the flow of FIG. 9 is ended. Here, whether or not the clutch starting control is under way may be determined by detecting whether or not the engine rotational speed is in a predetermined partial clutch engagement rotation region as aforementioned, or may be determined by a predetermined rule-based technique for ail or part of the four parameters of the engine rotational speed, the clutch hydraulic pressure (or clutch control current), the vehicle speed and the throttle angle (a technique of determining that the engine rotational speed is in the partial clutch region if the values of parameters are each in specific ranges).

In step S12, in regard of a throttle angle being detected by the throttle angle sensor 47 at the time point under consideration, a preliminarily prepared map of throttle angle and brake pressure as schematically exemplified in the column C12 is referred to, and the corresponding brake pressure is read from the map, after which the control proceeds to step S13.

In step S13, in regard of a vehicle speed of the rear wheel WR being detected by the vehicle speed sensor 16a at the time point under consideration, a preliminarily prepared map of rear wheel vehicle speed and brake correction coefficient as schematically exemplified in the column C13 is referred to, and the corresponding brake correction coefficient is read from the map, after which the control proceeds to step S14.

In step S14, the brake controller 1 obtains a required brake pressure by a calculation such as to apply the correction coefficient read in step S13 to the brake pressure read in step S12, after which the control proceeds to step S15. In step S15, a control of generating the brake pressure obtained in step S14 at the brake caliper 4a for the rear wheel WR is executed by the brake controller 1, after which the flow is ended.

The whole of the flow of FIG. 9 as above is carried out at each moment when the system 100A is operating, and the brake control by the brake controller 1 is executed at each moment as required and at a required strength, whereby the driver's uncomfortable feeling can be reduced.

Note that in order to generate the brake pressure in step S15, the brake circuit described referring to FIG. 5 is preliminarily set in the aforementioned automatic brake control possible state. While a condition where the negative determination is obtained in step S11 is continued, it is sufficient to apply the brake control described referring to FIG. 5, without applying the brake control of the present disclosure.

By the flow of FIG. 9, also, the same effect as described referring to FIG. 8 can be realized while the clutch starting control is carried out. For this reason, the map of throttle angle and brake pressure as exemplified in the column C12 is preliminarily prepared in the form of a map such that the brake pressure is set stronger as the throttle angle is greater. Here, a map may be preliminarily prepared such that the brake pressure is not strengthened further after the throttle angle has reached or exceeded a predetermined value, in addition, the map of rear wheel vehicle speed and correction coefficient as exemplified in the column C13 is preliminarily prepared as a correction coefficient such that the brake pressure to be applied is weakened as the vehicle speed rises, specifically, as a correction coefficient which is "1" while the vehicle speed is small and which decreases to "0" as the vehicle speed is enhanced.

It is sufficient that the calculation of brake pressure in step S14 is conducted by multiplying the brake pressure obtained in step S12 by the correction coefficient obtained in step S13. For example, while the correction coefficient is "1," the brake pressure obtained in step S12 is applied as it is; when the correction coefficient is "0.5," one half the brake pressure obtained in step S12 is applied; and when the correction coefficient is "0," the brake pressure actually applied is "0" (that is, no brake pressure is applied) whatever brake pressure is obtained in step S12. Note that the vehicle speed in the map in the column C13 is within the range of from 0 km/hour to approximately 6 km/hour. Therefore, the brake control in this modification is also conducted by applying brake for an extremely short time.

A modification of the first example and the second example as above may be conducted in the following manner. Here, in the case where the determination steps S1 to S3 in the first example are all cleared (where the determination such as to end the flow is not made but it is determined that the brake control is necessary), reference to the maps in step S4, calculation of a required brake pressure in step S5 and outputting of the brake pressure in step S6 have been carried out. In addition, in the case where the determination step S11 in the second example is cleared, reference to the maps in steps S12 and S13, calculation of a required brake pressure in step S14 and outputting of the brake pressure in step S15 have been carried out.

As above-mentioned, a required brake pressure is calculated and the brake pressure is outputted in either of the first example and the second example. In place of such a process, a predetermined brake pressure which is preliminarily set may be outputted, without calculating the required brake pressure. Specifically, in the first example, steps S4 and S5 may be omitted, and step S6 may be changed to a step of outputting a fixed brake pressure. In the second example, steps S12, S13 and S14 may be omitted, and step S15 may be changed to a step of outputting a fixed brake pressure.

According to this modification example, while the conditions of steps S1 to S3 and step S11 are satisfied, a fixed brake pressure is outputted constantly, whereby it is possible, through a simple control not needing reference to a map or calculations, to restrain an abrupt rise in the driving force and thereby to reduce the driver's uncomfortable feeling. This modification example can be carried out in the same manner also in second and third embodiments described below.

The brake control in the vehicle 10A illustrated in FIG. 1 has been described above as the first embodiment. Now, the second and third embodiments will be sequentially described below. Here, the second embodiment is an embodiment concerning a brake control in a vehicle 10B which will be described referring to FIGS. 10 and 11 and the like, and the third embodiment is an embodiment concerning a brake control in a vehicle 10C which will be described referring to FIGS. 13 and 14 and the like. Relations between the first to third embodiments (differences between the embodiments) are as follows.

In the vehicle 10A according to the first embodiment, as illustrated in FIGS. 2 to 4, the starting clutch has been configured as a variable capacity clutch such that clutch capacity can be selected, and the automatic clutch operating device 18 has been a device for electronically controlling the capacity of the variable capacity clutch. Besides, in the vehicle 10B according to the second embodiment, a device corresponding to the starting clutch and the automatic clutch operating device 18 in the first embodiment is provided as a centrifugal clutch including an inner rotor, an outer rotor and centrifugal weights capable of effecting engagement and disengagement of the inner rotor and the outer rotor. In addition, while the transmission in the first embodiment has been configured as a combination of the transmission gears illustrated in FIG. 3, a transmission in the vehicle 10B according to the second embodiment is configured as a continuously variable transmission.

Further, in the vehicle 10C according to the third embodiment, a centrifugal clutch is provided in the same manner as in the second embodiment; however, while the power source in the vehicle 10B according to the second embodiment is an engine, a power source in the vehicle 10C according to the third embodiment is configured as a motor. Besides, while the transmission is provided in the first, embodiment and the second embodiment, a transmission is omitted in the vehicle 10C according to the third embodiment.

In the vehicle 10B according to the second embodiment and the vehicle 10C according to the third embodiment, also, it is possible, by applying the brake control of the present disclosure in the same manner as in the first embodiment, to reduce the uncomfortable feeling in the same manner as in the first embodiment.

Figure 10:
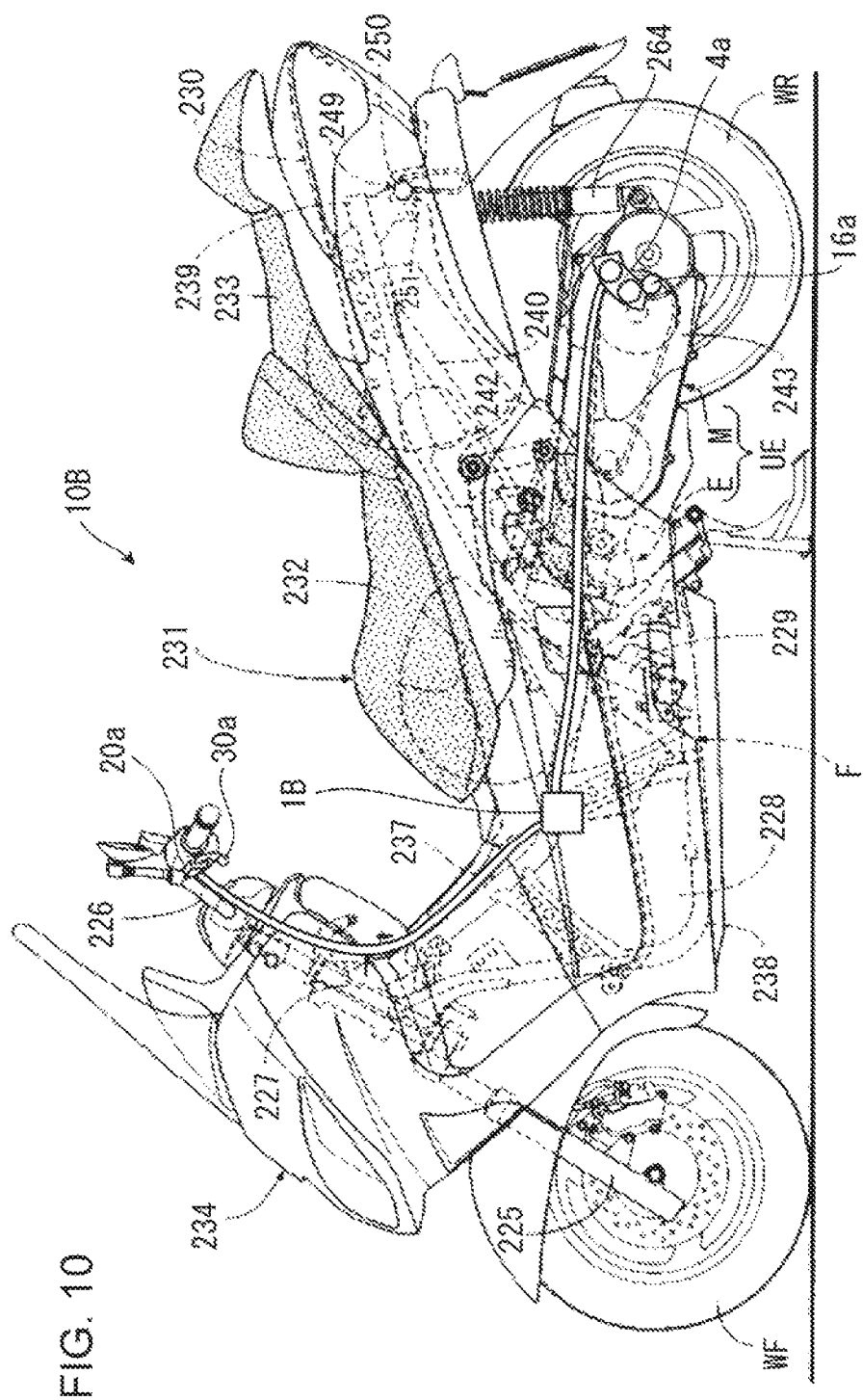
FIG. 10 is a side view of a motorcycle to which a brake controller according to a second embodiment has been applied.

FIG. 10 is a left side view of a scooter type vehicle 10B to which a brake controller 1B according to the second embodiment of the present invention has been applied. A body frame F of the scooter type vehicle 10B which is a motorcycle is provided at a front end thereof with a head pipe 227 on which a front fork 225 rotatably supporting a front wheel WF and a steering handle 226 connected to the front fork 115 are supported in such a manner as to enable steering. A unit swing engine UE supporting a rear wheel WR, which is a driving wheel, at a rear end thereof is vertically swingably supported at an intermediate portion in the longitudinal vehicle direction of the body frame F. A fuel tank 228 formed to be elongated vertically in side view and a radiator 229 disposed on the rear side of the fuel tank 228 are mounted on the body frame P on the front side of the unit swing engine UE. In addition, a storage box 230 is mounted to the body frame F in such a manner as to cover the unit swing engine UE from above. A riding seat 231 configured in a tandem type having a front seat 232 and a rear seat 233 is disposed on the storage box 230. Further, a body cover 234 made of synthetic resin for covering a front portion of the unit swing engine OS, the fuel tank 228, the radiator 229 and the storage box 230 is mounted to the body frame F.

The body frame F includes: the head pipe 227; a pair of left and right upper down frames 237 . . . (" . . . " means a pair of left and right members, here and hereafter) connected to the head pipe 227 and extending rearwardly downward; a pair of left and right lower down frames 238 . . . connected to the head pipe 227 on the lower side of the upper down frames 237 . . . and having rear ends welded to rear end portions of the upper down frames 237 . . . ; a pair of left and right seat rails 239 . . . extending rearwardly upward from intermediate portions of the upper down frames 237 . . . , and a pair of left and right rear frames 240 . . . interconnecting rear portions of the upper down frames 237 . . . and rear portions of the seat rails 239 . . . .

The unit swing engine UE includes a water-cooled engine E with a cylinder axis set substantially horizontally, and a belt-type continuously variable transmission M wherein an output of the engine E is transmitted to the rear wheel WR in a continuously variable manner by a transmission belt and pulleys. The continuously variable transmission M is so configured that a movable pulley on the crankshaft side is driven according to an operation of a transmission electric motor (not illustrated in FIG. 10) to thereby change the transmission gear ratio in a continuously variable manner.

A transmission case 243 of the continuously variable transmission M is connected to a left-side portion of a crankcase 374 (see FIG. 11) of the engine E in such a manner as to project to the left side from the engine E, and is extended to the left side of the rear wheel WR. In addition, a front end portion of a swing arm 383 (not illustrated in FIG. 10; see FIG. 11) is joined to a right-side portion of the crankcase 374, and the rear wheel WR is rot at ably supported between a rear end portion of the transmission 243 and a rear end portion of the swing arm 383.

In addition, support plates 249 . . . extending downward are attached to rear ends of both the seat rails 239 . . . of the body frame F. Upper end portions of rear cushions 264 . . . are connected to a pair of brackets 251 . . . provided on a support pipe 250 arranged between both the support plates 249 . . . . Lower end portions of both the rear cushions 264 . . . are connected to a rear end portion of the transmission case 243 and a rear end portion of the swing arm 248, which is a support member.

Further, as a configuration for performing a brake operation on the side of the rear wheel WR, which is the driving wheel, by automatic control or manually, a brake controller 1B is disposed in a space surrounded by the pair of left and right upper down frames 237 . . . , and a master cylinder 20*a* for generating a hydraulic pressure by a driver's operation of a brake lever 30*a* is disposed on the steering handle 226. A brake disk mounted to the rear wheel WR is provided with a brake caliper 4*a* for braking the brake disk by a hydraulic pressure generated in a brake pipe either by a driver's operation of the brake lever 30*a* or by automatic control conducted by the brake controller 1B, and is provided with a vehicle speed sensor 16*a* for determining the vehicle speed by detecting the rotational speed of the rear wheel WR.

Here, the brake controller 1B according to the second embodiment is configured in substantially the same manner as the brake controller 1 according to the first embodiment described above referring to FIG. 5, and its operation is the same as described above referring to FIG. 5; therefore, overlapping descriptions of the configuration and operation are omitted here. A difference in the configuration lies only in that the brake pedal 3*a* and the master cylinder 2*a* provided as a configuration for braking the rear wheel WR by a driver's brake operation in the first embodiment are changed to a brake lever 30*a* and a master cylinder 20*a* which are provided at a steering handle 226 as illustrated in FIG. 10. The other brake circuit configuration and the like are commonly shared by the first embodiment and the second embodiment, and, accordingly, quite the same operation as described in the first embodiment above can be carried out also by the brake controller 1B. From this point of view, as to the brake caliper 4*a* and the vehicle speed sensor 16*a*, the common reference symbols are used in the first embodiment (FIGS. 1 and 5) and the second embodiment (FIG. 10). This applies also to the third embodiment which will be described later.

Figure 11:
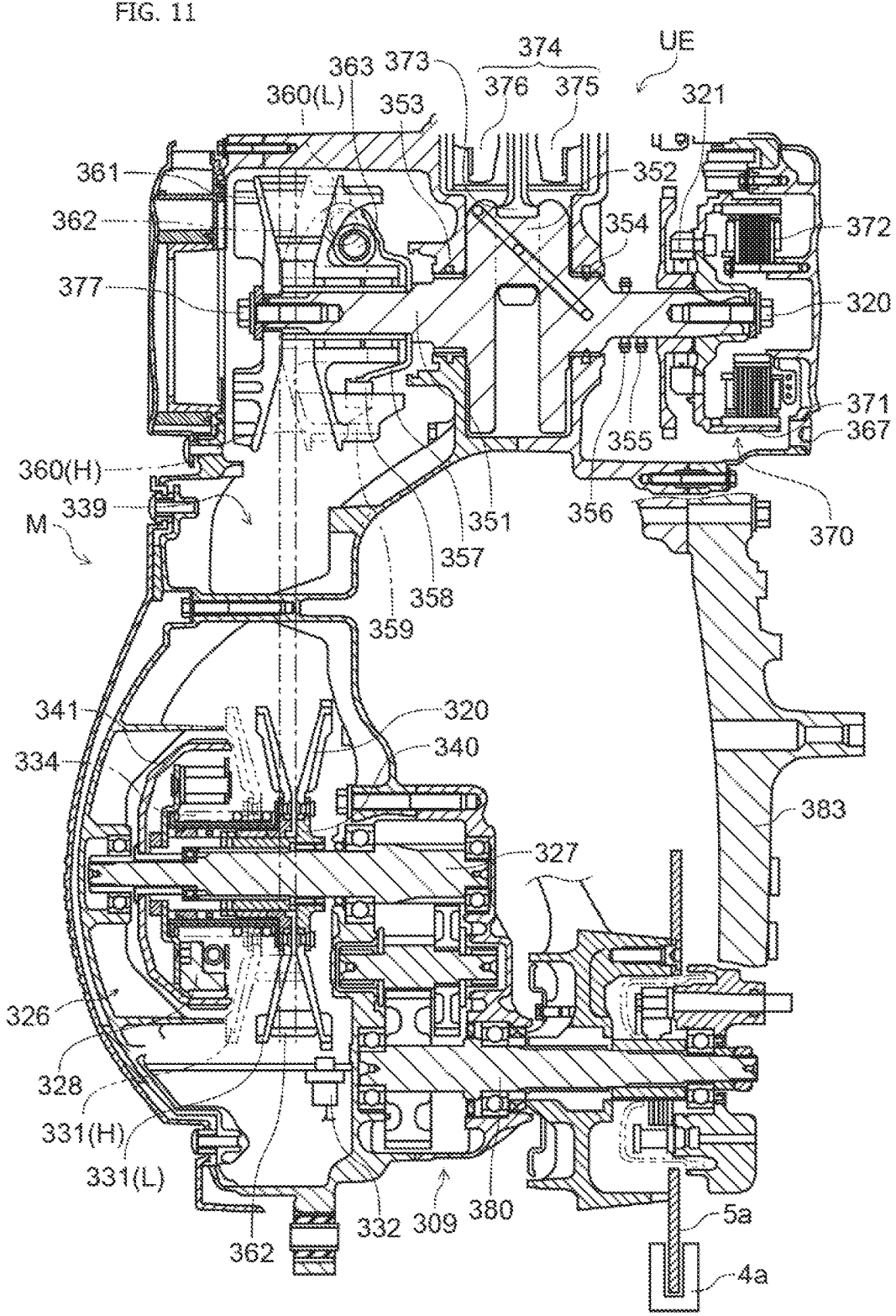
FIG. 11 illustrates a unit swing engine in FIG. 10, as a sectional view.

FIG. 11 illustrates the unit swing engine UE of FIG. 10, as a sectional view as viewed from above the vehicle 10B. The unit swing engine UE has a crankcase 374 including a right case 375 on the right side in the transverse direction (vehicle width direction) and a left case 376 on the left side in the transverse direction. A crankshaft 351 is rotatably supported by bearings 353 and 354 which are fixed to the crankcase 374. A connecting rod 373 is connected to the crankshaft 351 through a crank pin 352.

The left case 376 functions also as the transmission case 243 (FIG. 10). A belt driving pulley including a movable-side pulley half 360 and a fixed-side pulley half 361 is mounted to a left end portion of the crankshaft 351. The fixed-side pulley half 361 is fastened to the left end portion of the crankshaft 351 by a nut 377. In addition, the movable-side pulley half 360 is spline fitted to the crankshaft 351, to be slidable in the axial direction. Between both the pulley halves 360 and 361, a V belt 362 is arranged.

On the right side of the movable-side pulley half 360, a ramp plate 357 is fixed to the crankshaft 351. A slide piece 358 attached to an outer peripheral end portion of the ramp plate 357 is engaged with a ramp plate sliding boss part 359 formed in the axial direction at an outer peripheral end of the movable-side pulley half 360. The ramp plate 357 is formed at its outer peripheral portion with a tapered surface inclined toward the movable-side pulley half 360 in going radially outward. A plurality of weight rollers 363 are accommodated between the tapered surface and the movable-side pulley half 360.

When the rotational speed of the crankshaft 351 increases, the weight rollers 363 are moved radially outward by a centrifugal force. By this movement, the movable-side pulley half 360 is moved leftward in the drawing to approach the fixed-side pulley hair 361. As a result, the V belt 362 interposed between both the pulley halves 360 and 361 is moved radially outward, whereby the wrapping radius is increased. On the rear side of the unit swing engine UE, driven pulleys 320 and 331 (driven-side pulley 339) such that the wrapping radius of the V belt 362 is variable according to both the pulley halves 360 and 361 (driving pulley) are provided. A driving force of the engine is automatically adjusted by the above-mentioned belt transmission mechanism, and is transmitted to the rear wheel WR through the centrifugal clutch and a speed reduction mechanism 309 on the rear side of the transmission case 243 (FIG. 10).

An alternate current generator (ACG) starter motor 370 having a starter motor and an AC generator combined with each other is disposed inside the right case 375. The ACG starter motor 370 includes an outer rotor 371 fixed to a tip tapered portion of the crankshaft 351 by an attaching bolt 320, and a stator 372 disposed inside the outer rotor 371 and fixed to the right case 375 by an attaching bolt 321. A radiator (not illustrated) and a cover member (not illustrated) formed with a plurality of slits are mounted on the right side in the drawing of an air fan (not illustrated) fixed to the outer rotor 371 by an attaching bolt 367.

A sprocket 355 around which a cam chain for driving a valve mechanism is wrapped is fixed to the crankshaft 351, between the ACG starter motor 370 and the bearing 554. The sprocket 355 is formed to be integral with a gear 356 for transmitting power to an oil pump for circulating an engine oil.

Besides, the driven-side pulley 339 is provided with a driven-side fixed pulley half 320 fixed to a sleeve 340 rotated as one body with a rotating body retaining a starting clutch 326, and a driven-side movable pulley half 331 slidable in the axial direction relative to the sleeve 340. The V belt 362 is wrapped around belt grooves having a substantially V-shaped cross section which are each formed between the driving-side fixed pulley half 361 and the driving-side movable pulley half 360 and between the driven-side fixed pulley half 320 and the driven-side movable pulley half 331. In addition, a spring 334 for normally biasing the driven-side movable pulley half 331 toward the driven-side fixed pulley half 320 is disposed on the back side of the driven-side movable pulley half 331.

In the case where the rotational speed of the driven-side pulley 339 is less than a predetermined value, the starting clutch 326 interrupts transmission of a driving force between the driven-side pulley 339 and a driving shaft 327. When the engine rotational speed rises and the rotational speed of the driven-side pulley 339 reaches or exceeds a predetermined value (for example, when the engine rotational speed is raised to 3,000 rpm, starting from a state where the engine rotational speed is low and a speed reduction at the pulley is at maximum), the starting clutch 326 is operated by a centrifugal force such that the inner rotor 328 presses an inner peripheral surface of the outer case (outer rotor) 341. As a result, the notation of one drivers-side pulley 339 is transmitted through the starting clutch 326 to the outer case 341, and the rotation is transmitted through the driving shaft 327 fixed to the outer case 341 and the speed reduction mechanism 309 meshing with the driving shaft 327, to rotate an axle 380 of the rear wheel WR. Note that a driven pulley rotational sensor 332 for detecting the rotational speed of the sleeve 340 may be mounted in the vicinity of the sleeve 340, to directly detect the rotational speed of the driven pulley.

The transmission gear ratio of the automatic transmission M is automatically changed by radially outward movement of the weight rollers 363 by the centrifugal force, attendant on an increase in the rotational speed of the crankshaft 351, as aforementioned. Specifically, in the case of a change in a shifting-up direction (top ratio direction) attendant on high-speed rotation, the driving-side movable pulley half 360 is slid leftward in the drawing. As a result, the driving-side movable pulley half 360 approaches the driving-side fixed pulley half 361 by an amount corresponding to the amount of sliding, and the width of the belt groove of the driving-side pulley is reduced. Consequently, the position of contact between the driving-side pulley and the V belt 362 is shifted radially outward, and the wrapping radius of the V belt 162 increases (in this figure, a low-ratio position 360(L) is illustrated on the upper side of the crankshaft 351, and a top-ratio position 363(H) is illustrated on the lower side of the crankshaft 351).

Figure 12:
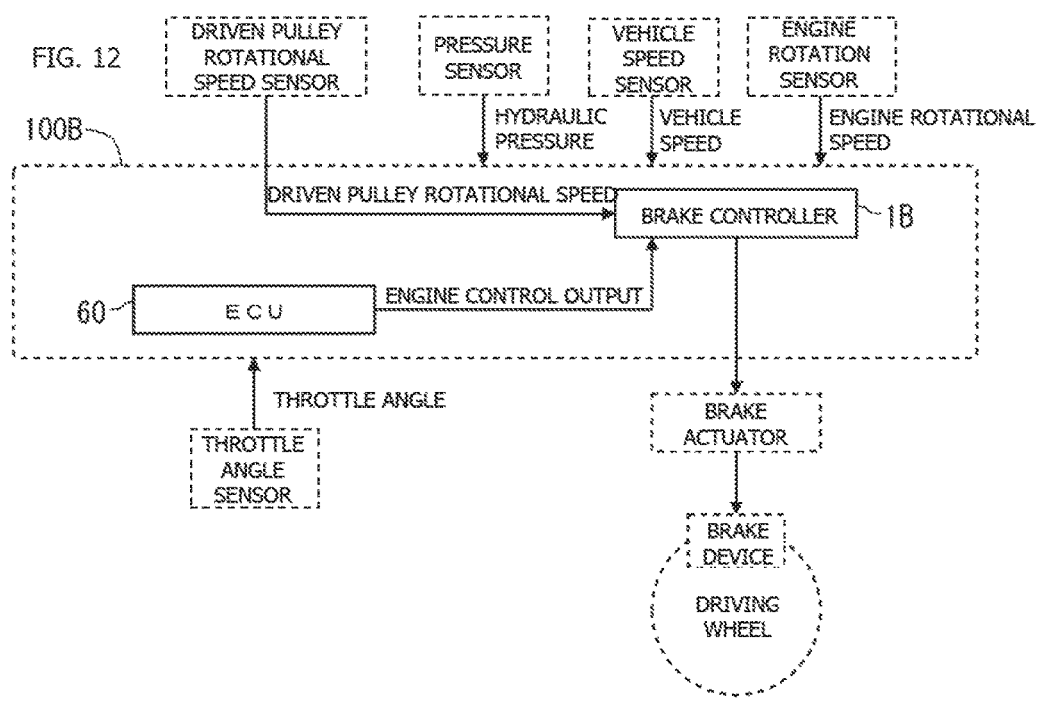
FIG. 12 illustrates main part of a system configuration for realizing a reduction in the driver's uncomfortable feeling in the second embodiment.

FIG. 12 illustrates a main part of a system configuration for realizing a reduction in the driver's uncomfortable feeling in the second embodiment. A system 100B is provided with a brake controller 1B and an ECU 60. The system 100B differs from the system 100A according to the first embodiment illustrated in FIG. 6 only in that, as information corresponding to the starting control signals (engine rotational speed and the like) acquired from the automatic clutch operating device 18 in the first embodiment, the driven pulley rotational speed detected by the driven pulley rotational speed sensor (332) is further added, and the signals can be received by the brake controller 1B. The system 100B can perform the same brake control as that by the system 100A.

Specifically, when it is determined that the centrifugal clutch (starting clutch 326) is in a partial clutch engagement state, on the basis of the starting control signals additionally including the driven pulley rotational speed, the brake controller 1B of the system. 100B performs the same brake control as that in the first embodiment, whereby the driver's uncomfortable feeling can be reduced.

In one example, in the second embodiment, also, the brake controller 1B can perform brake control by quite the same technique as in the first embodiment, without utilizing at all the driven pulley rotational speed which can be referred to in an additional manner.

In addition, in another example, the brake controller 1B in the second embodiment can carry out brake control by quite the same technique as in the first embodiment, while using the driven pulley rotational speed in place of the engine rotational speed which has been, referred to in the first embodiment. In this case, it is sufficient to perform determination in step S3 of FIG. 7 and step S11 of FIG. 9, by preliminarily setting a predetermined partial clutch engagement rotation region for the driven pulley rotational speed, like the predetermined partial clutch engagement rotation region preliminarily set for the engine rotational speed. Besides, it is sufficient to adopt the driven pulley rotational, speed in place of the engine rotational speed, in performing the calculation of the norm driving torque and the expected driving torque and the calculation of the brake pressure in steps S4 and S5 of FIG. 7.

Here, if is sufficient that the partial clutch engagement rotation region for the driven pulley rotational speed is set as a predetermined rotational, speed region in which ON/OFF switching of the starting clutch 326, or engaging/disengaging operation of the inner rotor 328 and the outer rotor 341, is assumed to occur.

Note that while it is sufficient to check the pulley rotational speed in the partial clutch engagement rotation region, it is assumed that the speed reduction ratio in the continuously variable transmission is constant at a substantially maximum value and the engine rotational speed and the driven pulley rotational speed are almost proportional to each other, and, accordingly, the engine rotational speed can be used in the second embodiment, as aforementioned.

In a further example, a combination of the above-mentioned two examples may be adopted. Specifically, both the engine rotational speed and the driven pulley rotational speed may fee used in determination of the partial clutch engagement rotation region and calculation of each torque, etc.

Figure 13:
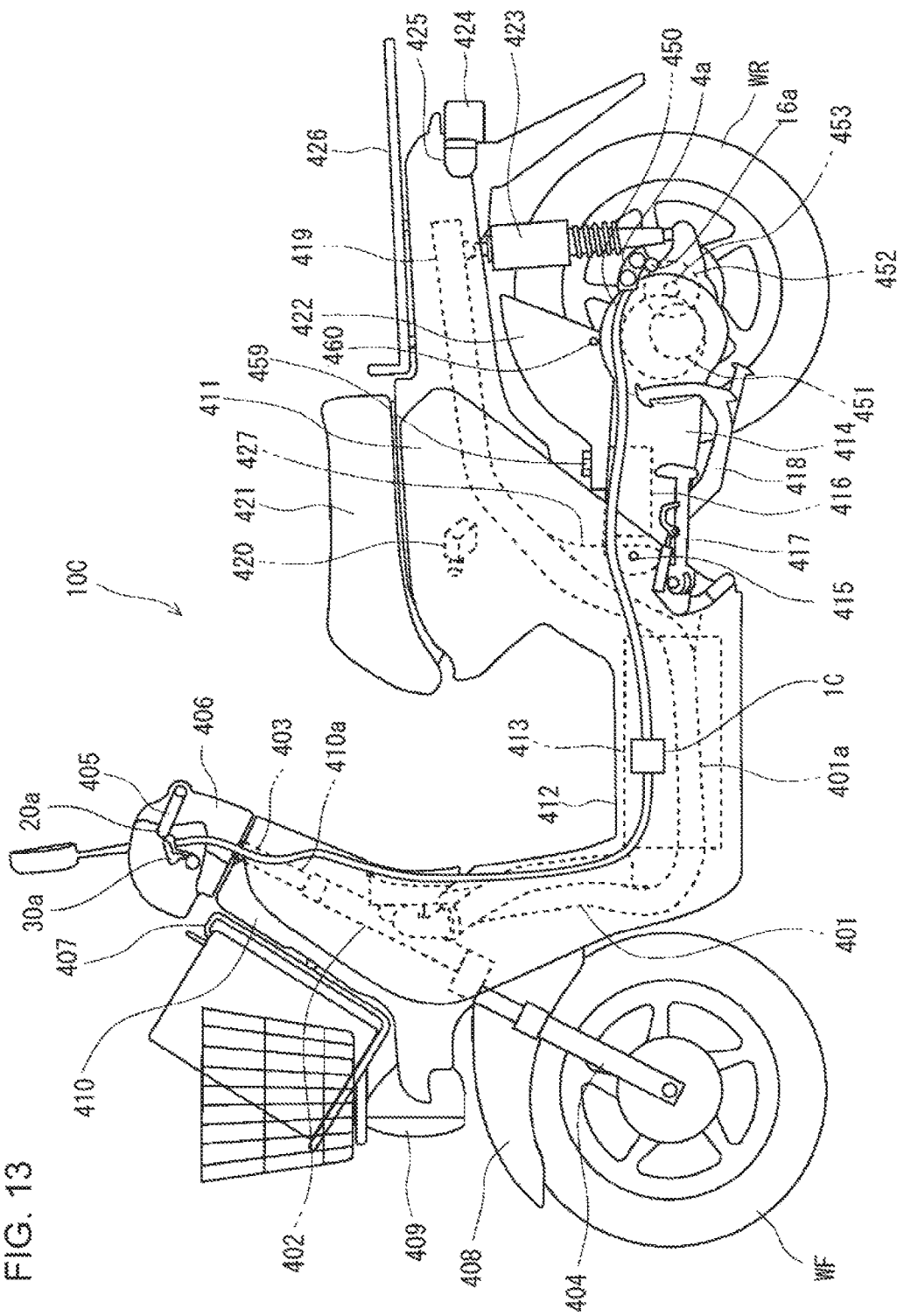
FIG. 13 is a side view of a motorcycle to which a brake controller according to a third embodiment has been applied.

FIG. 13 is a side view of an electric vehicle 10C to which a brake controller 1C according to the third embodiment of the present invention has been applied. The electric vehicle 10C is a vehicle having an electric motor 450 disposed in the vicinity of an axle 453 on a cantilever type swing arm 414. In the electric vehicle 10C, a motor driver 416 is disposed such as to straddle a vehicle body center line on the rear side of a swing arm pivot (oscillation shaft) 415, wherein the position of the center of gravity of the motor driver 416 is located on the right side in the transverse direction of the vehicle body center line.

In addition, the motor driver 416 is mounted such as to be inserted from above into a recess (not illustrated) formed in the swing arm 414 to open to the upper side. A cover member (not illustrated) Of the motor driver 416 is formed with an attachment part (not illustrated) for attaching the motor driver 416 to the swing arm 414. A center stand 418 is attached to a lower surface of the swing arm 414, and a fender (mudguard) for the rear wheel WR is attached to an upper surface of the motor driver 416.

The electric vehicle 10C is a scooter type motorcycle having a low floor 412, wherein the rear wheel WR is driven by a rotational driving force of the electric motor 450 provided inside the swing arm 414. A high-voltage battery 413 for supplying electric power to the electric motor 450 can be charged by connecting an external power source to a battery charging port 420 provided under a seat 421.

A head pipe 402 on which a steering stem 403 is rotatably supported is connected to a front-side end portion of a main frame 401. A steering handle 405 is attached to an upper portion of the steering stem 403, and, on the other hand, a pair of left and right front forks 404 are attached to a lower portion of the steering stem 403. A front wheel WF is rotatably supported on lower end portions of the front forks 404.

A pair of left and right lower frames 401a are connected to lower portions of the main frame 401, and the high-voltage battery 413 is disposed in the manner of being interposed between the left and right lower frames 401a. The lower frames 401a are bent toward the vehicle body upper side on the rear side, to be connected to rear frames 419.

Pivot plates 427 having the swing arm pivot 415 are attached to rear portions of the lower frames 401a. A front end portion of a cantilever type swing arm 414 supporting the rear wheel WR by only an arm on the Left side in the transverse direction is swingably supported on the swing arm pivot 415. The rear wheel WR fixed to the axle 453 is rotatably supported on a rear portion of the swing arm 414. A rear end portion of the swing arm 414 is suspended from the rear frames 419 by a rear cushion unit 423.

A motor driver (power drive unit (PDU)) 416 by which a direct current (DC) current supplied from the high-voltage battery 413 is converted into an AC current and the AC current is supplied to the electric motor 450 is disposed at a position on the vehicle body front side of the swing arm 414. The electric power supplied from the motor driver 416 is supplied to the electric motor 450 through three power supply lines (not illustrated). A first speed reduction gear 451 and a second speed reduction gear 452 of a speed reduction mechanism described later are disposed on the rear side of the electric motor 450. The rear wheel WR is driven by the axle 453 fixed to the second speed reduction gear 452.

A vehicle body central portion of the steering handle 405 is covered with a handle cover 406. The head pipe 402 is covered with a front cowl 410 on the vehicle body front side and a floor cover 410a on the vehicle body rear side. A carrier 407 is disposed on the front side of the front cowl 410, and a headlamp 409 is supported on the tip of a forwardly extending portion of the front cowl 410 on the lower side of the carrier 407. On the lower side of the headlamp 409, a front fender 408 for the front wheel WF is mounted.

The low floor 412 on which to put the driver's feet is formed on the upper side of the high-voltage battery 413. Outer sides of the rear frames 419 are covered with a seat cowl 411. A seat 421 opened and closed through a hinge on the vehicle body front side is mounted on the upper side of the seat cowl 411. A carrier 426 is fixed on the rear side of the seat 421, and a tail lamp device 424 and a pair of left and right direction indicators 425 are attached to a rear end portion of the seat cowl 411. A rear fender 422 for the rear wheel WR is attached to an upper portion of the swing arm 414 by use of fastening members 459 and 460 such as bolts.

A side stand 417 is rotatably supported on the pivot plate 427 on the left side in the transverse direction. The center stand 418 having two base portions spaced apart in the transverse direction is rotatably attached to a lower portion of the swing arm 414.

The vehicle 10C further has the same configuration as that in the second embodiment, as a configuration for performing brake operation on the side of the rear wheel WR, which is a driving wheel, by automatic control or manually. Specifically, a brake controller 1C according to the third embodiment is disposed in a space surrounded by the left and right lower frames 401a, and a master cylinder 20a for generating a hydraulic pressure by a driver's operation of a brake lever 30a is disposed on the steering handle 405. A brake disk mounted to the rear wheel WR is provided with a brake caliper 4a for braking the brake disk by a hydraulic pressure generated in a brake pipe by a driver's operation of the brake lever 30a or automatic control conducted by the brake controller 1C. At the brake disk, there is also provided a vehicle speed sensor 16a for determining the vehicle speed by detecting the rotational speed of the rear wheel WR.

Since the brake controller 1C according to the third embodiment has the same configuration as in the second embodiment, brake control on the side of the rear wheel WR, which is the driving wheel, can be performed by automatic control or manually in quite the same manner as in the second embodiment.

Figure 14:
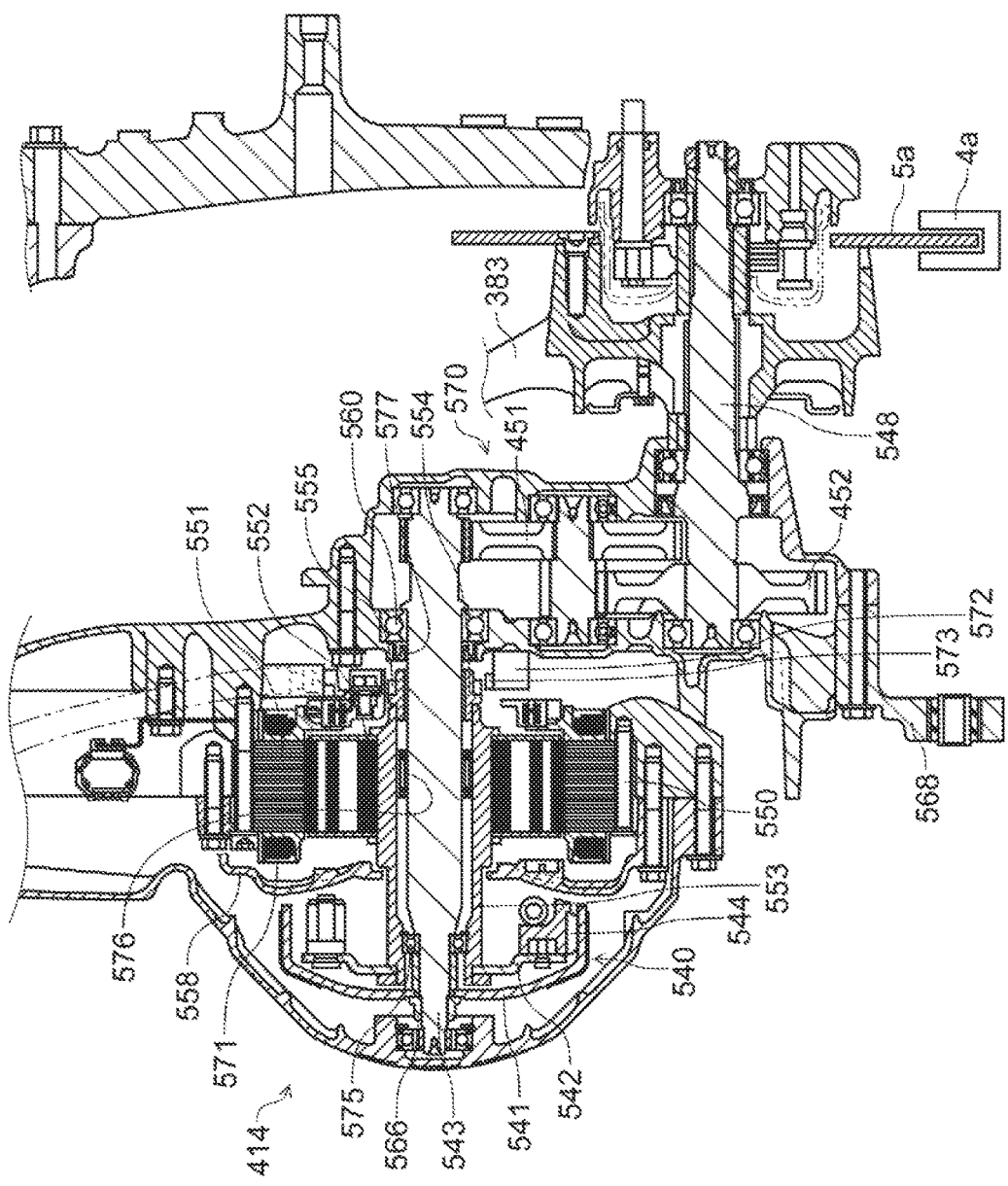
FIG. 14 illustrates a major part on the vehicle body rear side of a swing arm in FIG. 13, as a sectional view.

FIG. 14 illustrates a major part on the vehicle body rear side as a sectional view, as viewed from the vehicle body upper side, of the swing arm 414 of FIG. 13. The swing arm 414 is swingably supported on the pair of left and right pivot plates 427 (FIG. 13) through a swing arm pivot (pivot shaft) 415 (FIG. 13).

The swing arm 414 according to this embodiment supports the rear wheel WR in a rotatable manner. An electric motor 550, a centrifugal clutch 540 as an engaging/disengaging mechanism for transmitting and interrupting the transmission of a rotational driving force; and a speed reduction mechanism 370 are concentratedly disposed at a position on the vehicle body rear side of an arm portion of the swing arm 414.

The electric motor 550 is of an inner rotor system including a stator 551 fixed to an inner wall of the swing arm 414 and having a stator coil 571, and a rotor 552 fixed to a motor driving shaft 553. A left side in the drawing of the motor driving shaft 553 having a hollow cylindrical shape is rotatably supported by a bearing 559 of a stator cover 558 attached to an inner wall of the swing arm 414 such as to cover the electric motor 550. In addition, to a right side end portion in the drawing of the motor driving shaft 553, there is mounted a hollow cylindrical collar 554 for supporting a magnetic body 555 as a body to be detected of a motor rotational speed, sensor 572. The motor rotational speed sensor 572 having a detecting part 573 is fixed to an inner wall surface of the swing arm 414 by an attaching screw (not illustrated).

An output shaft 543 is supported by a bearing 560 fitted to a transmission case 568 of the swing arm 414, on the right side in the drawing of the electric motor 550. Besides, on the left side in the figure of the electric motor 550, the motor driving shaft 553 is supported by bearings 575 and 576, as aforementioned. In addition, an oil seal 577 is disposed on the left side in the drawing of the bearing 560.

The centrifugal clutch 540 includes a drive plate 542 provided, with a clutch shoe 544, and a clutch outer 541 driven to rotate by a frictional resisting force of the clutch shoe 544. The drive plate 542 is fixed to a left side end portion in the figure of the motor driving shaft 553. Besides, the clutch outer 541 is fixed to the output shaft 543 rotatably inserted in the motor driving shaft 553, by a nut 566. Note that the motor driving shaft 553 and the output shaft 543 are configured to be rotatable relative to each other through the two bearings 575 and 576.

The centrifugal clutch 540 is so configured that when the motor driving shaft 553 reaches or exceeds a predetermined rotational speed, that is, when the drive plate 542 reaches or exceeds a predetermined rotational speed, the clutch shoe 544 is moved radially outward to generate a frictional resisting force, whereby the clutch outer 541 is driven to rotate. As a result, a rotational driving force of the electric motor 550 is transmitted to the output shaft 543.

The rotational driving force thus transmitted to the output shaft 543 is transmitted through the speed reduction mechanism 570 to a final output shaft 548 (the axle 453 in FIG. 13). Here, as aforementioned, also in FIG. 13, the speed reduction mechanism 570 is configured by disposing the first speed reduction gear 451 and the second speed reduction gear 452.

As has been described above, according to the electric vehicle 10C, the centrifugal clutch 540 that starts transmission of a rotational driving force when the electric motor 550 reaches or exceeds a predetermined rotational speed is provided between the electric motor 550 and the speed reduction mechanism 570. Until the electric motor 550 reaches or exceeds the predetermined rotational speed, therefore, a load is not exerted on the electric motor 550; accordingly, the electric motor 550 can be smoothly started to rotate. As a result, the vehicle can be started smoothly even in the case where the vehicle weight is large or where the vehicle is started on a slope. Further, since the centrifugal clutch 540 is in a disengaged state until the electric motor 550 reaches or exceeds the predetermined rotating speed, heaviness due to rotational resistance of the electric motor 550 is prevented from being generated when the driver walks while pushing the vehicle forward.

However, in a partial clutch engagement state where the centrifugal clutch 540 is switched ever from a disengaged state to an engaged state, an abrupt torque may be generated on the driving wheel WR, to give an uncomfortable feeling to the driver. By the automatic brake control according to the present disclosure, however, the uncomfortable feeling can be reduced.

FIG. 15 illustrates a major part of a system configuration for realizing a reduction in the driver's uncomfortable feeling in the third embodiment. A system 100C includes the brake controller 1C and the motor driver 416. The system 100C differs from the system 100A according to the first embodiment illustrated in FIG. 6 in: that the motor driver 416 is provided in place of the ECU 60, since the power source is not the engine but the motor; that speed change can be achieved through motor control by the motor driver 416 and therefore a device corresponding to the transmission (the automatic clutch operating device 18 in the first embodiment) is not needed; and that a motor rotational speed detected not by the engine rotational speed sensor but by the motor rotational speed sensor (572) is received, since the power source is not the engine but the motor.

Under these differences, in the brake controller 1C of the system 100C according to the third embodiment, also, brake control at the time of starting control can be performed and the driver's uncomfortable feeling can be thereby reduced, like in the brake controller 1 of the system 100A according to the first embodiment or the brake controller 1B of the system 100B according to the second embodiment.

Here, whether or not the starting control is under way may be determined by determining whether or not the motor rotational speed detected by the motor rotational speed sensor (572) is in a predetermined starting rotational speed region (a rotational speed region based on the same thought as that for the predetermined partial clutch engagement rotation region in one first embodiment). In this case, the predetermined starting rotational speed region in regard of the motor rotational speed may be set as a predetermined rotational speed region in which switching-ON/OFF of the starting clutch 540, or engaging/disengaging operation of the drive plate 542 (corresponding to the inner rotor) and the clutch outer 541 (corresponding to the outer rotor), is assumed to occur, like the region in which switching-ON/OFF of the starting clutch 326 occurs in the second embodiment.

In this way, by replacing the "engine rotational speed" with the "motor rotational speed," the same processing as that in the flows of FIGS. 7 and 9 in the first embodiment can be carried out in the same manner also in the brake controller 1C in the third embodiment. In this instance, the throttle angle in the first embodiment may be replaced by the throttle angle in the electric motor 450 in the third embodiment, whereby the same processing as that in the first embodiment can be realized also in the third embodiment. The throttle angle in the electric motor 450 may be acquired as a driver's gripping-in degree of an accelerator throttle (accelerator operation amount), or may be acquired as a motor control output for the electric motor 450 by the motor driver 416. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. An automatic clutch vehicle comprising:
 a power source configured as an engine or a motor;
 a driving force transmission device provided between the power source and a driving wheel;
 a starting clutch which is provided in the driving force transmission device and which is engaged or disengaged to transmit or interrupt transmission of a rotating force of the power source to the driving wheel;
 an automatic clutch operating device which automatically performs an operation of engaging or disengaging the starting clutch;
 a brake device which is provided at the driving wheel and brakes the driving wheel;
 a brake actuator which operates the brake device; and
 a brake controller which controls the brake actuator,
 wherein the brake controller brakes rotation of the driving wheel by operating the brake actuator when the automatic clutch operating device automatically engages the starting clutch,
 wherein the automatic clutch vehicle further comprises:
 a rotational speed sensor which detects a rotational speed of the power source, and
 a vehicle speed sensor which detects a vehicle speed of the vehicle,
 wherein the brake controller determines whether the vehicle speed detected by the vehicle speed sensor is not more than a predetermined threshold and the rotational speed detected by the rotational speed sensor is in a predetermined partial clutch engagement rotation region in which the automatic clutch operating device automatically engages the starting clutch, and if so,
 brakes the driving wheel by operating the brake actuator.

2. The automatic clutch vehicle according to claim 1,
 wherein the power source is configured as the engine,
 the starting clutch is a variable capacity clutch such that clutch capacity can be selected,
 the automatic clutch operating device performs electronic control of capacity of the variable capacity clutch, and
 the brake controller controls the brake actuator by using a first parameter concerning the clutch capacity controlled by the automatic clutch operating device.

3. The automatic clutch vehicle according to claim 2, further comprising:
 an engine controller which controls the engine,
 wherein the brake controller controls the brake actuator by using a second parameter concerning an engine control output by the engine controller.

4. The automatic clutch vehicle according to claim 3,
 wherein the brake controller obtains an expected driving torque which is expected to be generated on the driving wheel in the case where control by the brake controller is not performed, by using the first parameter and the second parameter, obtains a norm driving torque which is smaller than the expected driving torque and serves as a norm, by using the first parameter and the second parameter, and controls the brake actuator by using a difference between the expected driving torque and the norm driving torque.

5. The automatic clutch vehicle according to claim 4 wherein the norm driving torque is a driving torque to start the vehicle without causing an abrupt change in a driving wheel torque generated on the driving wheel.

6. The automatic clutch vehicle according to claim 1, wherein the starting clutch and the automatic clutch operating device are configured as a centrifugal clutch including an inner rotor, an outer rotor and a centrifugal weight capable of engaging and disengaging the inner rotor and the outer rotor, the automatic clutch vehicle further comprises:

an inner rotor rotational speed sensor which detects rotational speed of the inner rotor in the centrifugal clutch, and the brake controller determines whether the vehicle speed detected by the vehicle speed sensor is not more than a predetermined threshold and the rotational speed detected by the inner rotor rotational speed sensor is in a predetermined partial clutch engagement rotation region in which the centrifugal clutch performs an engaging or disengaging operation, and if so, brakes the driving wheel by operating the brake actuator.

7. The automatic clutch vehicle according to claim 6, wherein the brake controller brakes the driving wheel by operating the brake actuator at a fixed output in the case where the vehicle speed is not more than the predetermined threshold and the rotational speed of the inner rotor is in the predetermined partial clutch engagement rotation region.

8. The automatic clutch vehicle according to claim 1, wherein the brake controller brakes the driving wheel by operating the brake actuator at a fixed output in the case where the vehicle speed is not more than the predetermined threshold and the rotational speed is in the predetermined partial clutch engagement rotation region.

9. The automatic clutch vehicle according to claim 1, wherein the brake controller actuates the brake actuator to suppress an abrupt change in a driving wheel torque generated on the driving wheel.

10. The automatic clutch vehicle according to claim 9, wherein the brake controller changes an amount of brake force in accordance with the rotating force transmitted to the driving wheel.

11. An automatic clutch vehicle comprising:
a power source configured as an engine or a motor;
a driving force transmission device provided between the power source and a driving wheel;
a starting clutch which is provided in the driving force transmission device and which is engaged or disengaged to transmit or interrupt transmission of a rotating force of the power source to the driving wheel;
an automatic clutch operating device which automatically performs an operation of engaging or disengaging the starting clutch;
a brake device which is provided at the driving wheel and brakes the driving wheel;
a brake actuator which operates the brake device; and
a brake controller which controls the brake actuator, wherein the brake controller brakes rotation of the driving wheel by operating the brake actuator when the automatic clutch operating device automatically engages the starting clutch, wherein the starting clutch and the automatic clutch operating device are configured as a centrifugal clutch including an inner rotor, an outer rotor and a centrifugal weight capable of engaging and disengaging the inner rotor and the outer rotor, the automatic clutch vehicle further comprises:

a rotational speed sensor which detects rotational speed of the inner rotor in the centrifugal clutch, and a vehicle speed sensor which detects a vehicle speed of the vehicle, and the brake controller determines whether the vehicle speed detected by the vehicle speed sensor is not more than a predetermined threshold and the rotational speed detected by the rotational speed sensor is in a predetermined partial clutch engagement rotation region in which the centrifugal clutch performs an engaging or disengaging operation, and if so, brakes the driving wheel by operating the brake actuator.

12. The automatic clutch vehicle according to claim 11, wherein the brake controller brakes the driving wheel by operating the brake actuator at a fixed output in the case where the vehicle speed is not more than the predetermined threshold and the rotational speed is in the predetermined partial clutch engagement rotation region.

13. The automatic clutch vehicle according to claim 11, wherein the brake controller brakes the driving wheel by operating the brake actuator at a fixed output in the case where the vehicle speed is not more than the predetermined threshold and the rotational speed is in the predetermined partial clutch engagement rotation region.

14. The automatic clutch vehicle according to claim 11, wherein the brake controller actuates the brake actuator to suppress an abrupt change in a driving wheel torque generated on the driving wheel.

15. The automatic clutch vehicle according to claim 14, wherein the brake controller changes an amount of brake force in accordance with the rotating force transmitted to the driving wheel.

* * * * *